United States Patent
Muramatsu et al.

(10) Patent No.: US 6,445,149 B1
(45) Date of Patent: Sep. 3, 2002

(54) VIBRATOR CONTROLLING METHOD AND VIBRATOR

(75) Inventors: Atsushi Muramatsu, Komaki; Hiroyuki Ichikawa, Kani, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 34 days.

(21) Appl. No.: 09/690,734

(22) Filed: Oct. 18, 2000

(30) Foreign Application Priority Data

Oct. 18, 1999 (JP) ............................................. 11-295917
Oct. 21, 1999 (JP) ............................................. 11-300174

(51) Int. Cl.[7] ........................ F16F 15/027; F16F 15/03; F16F 13/00
(52) U.S. Cl. ........................ 318/114; 318/128; 318/460; 267/140.15; 188/269
(58) Field of Search ............................ 74/574; 188/269; 267/140.14, 140.15; 318/114, 128, 129, 432, 460; 310/51

(56) References Cited

U.S. PATENT DOCUMENTS

| | | | | |
|---|---|---|---|---|
| 4,929,974 A | * | 5/1990 | Mizuno et al. | ............. 318/128 |
| 5,426,720 A | * | 6/1995 | Bozich et al. | ................. 395/22 |
| 5,903,077 A | * | 5/1999 | Garnjost et al. | ............... 310/81 |
| 6,055,317 A | * | 4/2000 | Muramutsu et al. | ........ 381/71.4 |

FOREIGN PATENT DOCUMENTS

JP          11-230245     * 8/1999

* cited by examiner

*Primary Examiner*—Nestor Ramirez
*Assistant Examiner*—Judson H. Jones
(74) *Attorney, Agent, or Firm*—Oblon, Spivak, McClelland, Maier & Neustadt, P.C.

(57) ABSTRACT

A reference pulse signal P is produced which is synchronized in frequency with a pulse signal S derived from a vibration source and has a predetermined duty ratio. Then, a control signal C is produced by providing at least one or more off intervals $\alpha$, $\beta$ . . . at a random timing and random width predetermined for the reference pulse signal P to have the control amplitude correlated with the amplitude of the vibrations at the vibration source. This control signal C is used for controlling the switching action of the electromagnetic valve to have a desired level of pressure change in an air chamber 35 of a pneumatic vibrator which in turn develops a vibrating force on a mass member 20. The vibrations of the mass member can thus offset the vibrations of the chassis of a vehicle. Also, an electromagnetic vibrator can produce a similar control signal for eliminating the vibrations of the chassis.

20 Claims, 17 Drawing Sheets

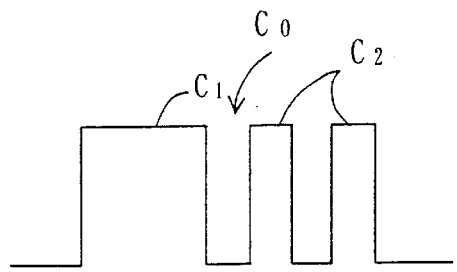
Fig. 4A
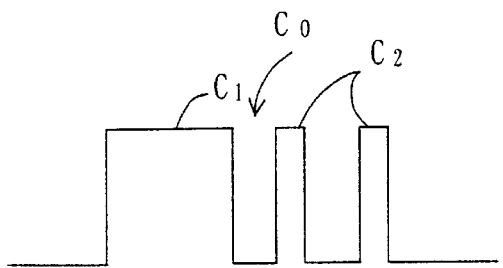
Fig. 4B
① Present invention (first component)
② Prior art (first component)
③ Present invention (second component)
④ Prior art (second component)
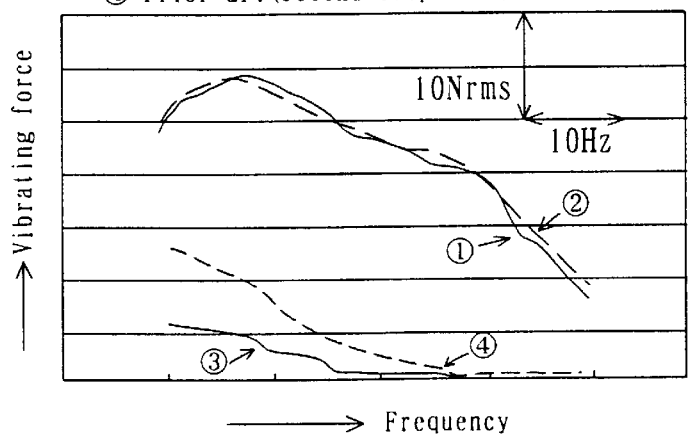
Fig. 5

VIBRATOR CONTROLLING METHOD AND VIBRATOR

BACKGROUND OF THE INVENTION

The present invention relates to a method and an apparatus for controlling a vibrator. Particularly, the present invention relates to a method and an apparatus for controlling a pneumatic vibrator suited for actively suppressing vibrations from a vibration source such as a vehicle. And the present invention also relates to an electromagnetic vibrator controlling method and an electromagnetic vibrator suited for actively suppressing vibrations from a vibration source such as a vehicle.

One of such known pneumatic vibrators is shown as a damper in Japanese Patent Laid-open Publication (Heisei) 11-230245 which comprises a mass member elastically supported by a mount attached to a vibrating object to be controlled, an air-tightly enclosed air chamber for changing its inner pressure to apply a vibrating force to the mass member, and a driving switch valve mounted across an air flow passage communicated with the air chamber for alternatively connecting to a negative pressure source and to the ambient pressure. The frequency and phase of vibration of the mass member can be controlled by operating the driving switch valve. As shown in FIG. 19, the air chamber of the damper 1 is communicated via the air flow passage 2 to the negative pressure source 3 such as an air intake port of an engine and the ambient pressure 4. When the switch valve 5 mounted across the air flow passage 2 switches between the negative pressure source 3 and the ambient pressure 4, the pressure in the air chamber can be varied to develop a desired level of vibrating force for vibrating the mass member. The switching action of the switch valve 5 for determining the vibrating force is controlled by changing the duty ratio of a control signal released from a driver 6. Such a conventional pneumatic vibrator is simple in the construction using not an electromagnetic driving means as a vibrating means in the damper and its advantages include smaller size, lighter weight, and lower power consumption.

However, the conventional pneumatic vibrator permits a change in the pressure in the air chamber determined by the switch valve 5 switching between the two different pressure sources 3 and 4 to generate not only a frequency component corresponding to the switching frequency but also a higher frequency component which may decline the effect of suppressing vibrations. For compensation, a silencer such as a branch hose 7 is provided across the air flow passage 2 between the air chamber and the switch valve 5 for reducing a change in the pneumatic pressure over a range of frequencies except the frequencies of vibration to be suppressed.

The silencer such as the branch hose 7 also attenuate a desired frequency component of the pneumatic pressure to be used together with the undesired higher frequency component, hence decreasing the vibrating force of the vibrator. FIG. 20 illustrates another conventional arrangement where a second electromagnetic valve 8 is provided across the air flow passage 2 for closing and opening the path between an air intake port 3 and a tank 3a arranged for stabilizing the negative pressure at the intake port 3. While the switching action of the first electromagnetic valve 5 is controlled by a pulse signal of a duty ratio tailored to minimize the higher frequency component and released from a driver 9, the closing and opening action of the second electromagnetic valve 8 is controlled by a signal of a duty ratio tailored to have an optimum level of the pneumatic pressure and released from the driver 9, thus suppressing the higher frequency component while eliminating the use of a branch hose. However, although the branch hose is eliminated, it is mandatory to provide the second electromagnetic valve 8 and the driver 9 in a combination and to control both the two electromagnetic valves 5 and 8 at a time with more difficulty. According, as the cost for controlling is increased, a resultant vibrator will hardly be priced down and be disadvantageous on the use in a vehicle or the like.

A further conventional electromagnetic vibrator is known as comprising an electromagnetic damper having a yoke with electromagnets mounted to a mount attached to a vibration source such as a vehicle chassis and a mass member elastically joined to the yoke by a rubber elastic member, and a drive controlling means for feeding the electromagnets with an electric control signal to produce a driving force corresponding to the magnitude of the electric control signal. This conventional vibrator drives the electromagnets to vibrate the mass member for generating a vibrating force which is used to actively suppress vibrations at the vibration source.

More specifically as shown in FIG. 21, the electric control signal C in the conventional vibrator is produced by having an input pulse signal S, e.g. an output of a rotary pulse sensor of which the frequency is correlated to the frequency of vibrations at the vibration source, synchronized and shifted by $\theta$ in phase, and provided with a duty ratio favorably correlated with a level of the control amplitude to correspond to the amplitude of vibrations at the vibration source. As the mass member is vibrated by a driving means receiving the electric control signal C, the vibration develops a driving force to suppress the vibrations on a vehicle.

However, in the electromagnetic vibrator, the turning on and off of the electric control signal may produce and add a higher frequency component to the driving signal of a reference frequency provided for driving the electromagnets, hence inhibiting the mass member from applying a desired level of the vibrating force. FIG. 22 illustrates a conventional method of constructing the electric control signal C, which comprises producing a reference pulse signal P which is synchronized with an input pulse signal S and has such a duty ratio determined as to develop a minimum of higher frequency component, producing a carrier signal (not shown) of which the frequency is higher than that of a reference pulse signal P while substituting and correlating the control amplitude with the duty ratio to correspond to the amplitude of vibrations at the vibration source, and superimposing the carrier signal over the reference pulse signal P. Accordingly, the generation of a higher frequency component in addition to the reference frequency in the driving signal for driving the electromagnets can be attenuated by the reference pulse signal while the amplitude of the driving signal can be controlled by superimposing the carrier signal of which the duty ratio corresponds to the amplitude of vibrations at the vibration source.

However, when the duty ratio of the carrier signal component in the electric control signal C is lowered, it permits the current for driving the electromagnets to be declined due to the time constant of the electromagnets acting as an actuator in the electromagnetic driving means. This causes the relationship between the vibrating force for vibrating the mass member and the duty ratio of the carrier signal to be not linear with each other, hence failing to suppress the vibration to a desired level.

SUMMARY OF THE INVENTION

It is an object of the present invention to eliminate the above described problems and provide a vibrator controlling method and a vibrator for applying a desired level of the vibrating force while readily removing a high frequency component. It is another object of the present invention to provide a pneumatic vibrator controlling method and a pneumatic vibrator for applying a desired level of the vibrating force while removing a high frequency component at a low cost with the use of a simple arrangement having no silencer such as a branch hose provided across the air flow passage. It is another object of the present invention to provide an electromagnetic vibrator controlling method and an electromagnetic vibrator for applying a desired level of the vibrating force while readily removing a high frequency component.

For achievement of the above object, a method of controlling a vibrator which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising the steps of: producing a reference pulse signal of a duty ratio synchronized with an input pulse signal correlated in the frequency with the vibrations at the vibration source; producing a carrier signal of which the frequency is higher than the frequency of the reference pulse signal while correlating and substituting the control amplitude with the duty ratio to correspond to the amplitude of the vibrations at the vibration source; and producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

According to the method of controlling a vibrator, as the electric control signal contains the reference pulse signal synchronized with the input pulse signal correlated in frequency with the vibrations at the vibration source and having a duty ratio tailored to minimize the generation of a high frequency component, it can successfully inhibit the generation of the high frequency component in the driving means and develop a desired level of the vibrating force which contains a corresponding frequency component. Also, as the electric control signal contains the carrier signal of which the frequency is higher than that of the reference pulse signal and which is superimposed on the reference pulse signal while its control amplitude is correlated with and substituted by the duty ratio to correspond to the amplitude of the vibrations at the vibration source, it can favorably determine the vibrating force in response to vibrations of the vibrating member. Moreover, the first spike of each pulse of the electric control signal produced by superimposing pulses of the reference pulse signal on pulses of the carrier signal is greater in width than the other spikes in the same pulse. As the width of the first spike is greater than the width of each of the other spikes in the pulse, delay of the response of a driving current fed to the switching means to the reception of the electric control signal, which inhibits the vibrating force from corresponding to the duty ratio of the carrier signal when the duty ratio is lowered, can be avoided. More specifically, the vibrating member can be vibrated with the driving current which corresponds to the duty ratio of the carrier signal or is correlated with the amplitude of the vibrations at the vibration source. Since the vibrating member is vibrated to a desired level, it can develop the vibrating force optimum for actively suppressing the vibrations at the vibration source.

A method of controlling the vibrator according to the present invention is provided composing the steps of: producing a reference pulse signal of a duty ratio synchronized with an input pulse signal correlated in the frequency with the vibrations at the vibration source; and producing the electric control signal by providing at least one off intervals of a predetermined random timing and random width in each pulse of the reference pulse signal to correlate the control amplitude with the amplitude of the vibrations at the vibration source.

This controlling method allows the electric control signal to contain the reference pulse signal synchronized with the input pulse signal correlated in frequency with the vibrations at the vibration source and having a duty ratio tailored to minimize the generation of a high frequency component so that it can successfully inhibit the generation of the high frequency component in the driving means and also develop a desired level of the vibrating force which contains a corresponding frequency component. Also, the electric control signal produced by providing at least one off intervals of a predetermined random timing and random width in each pulse of the reference pulse signal is used to control the switching action of the switching means, thus determining an optimum level of the vibrating force for the vibrations at the vibration source. Accordingly, the driving current determined by the electric control signal can successfully develop the vibrating force corresponding to the amplitude of the vibrations at the vibration source and attenuate the generation of the high frequency component at more effectiveness in addition to the effect of reducing the high frequency component derived from the reference pulse signal. As the vibrating force is determined to more precisely a desired level, it can actively suppress the vibrations at the vibration source.

A vibrator having a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising: a reference pulse signal producing means for producing the reference pulse signal of a duty ratio synchronized with an input pulse signal correlated in the frequency with the vibrations at the vibration source; a carrier signal producing means for producing a carrier signal of which the frequency is higher than the frequency of the reference pulse signal while correlating and substituting the control amplitude with the duty ratio to correspond to the amplitude of the vibrations at the vibration source; and an electric control signal producing means for producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

A further vibrator according to the present invention is provided comprising: a reference pulse signal producing means for producing a reference pulse signal having a given duty ratio and synchronized with an input pulse signal correlated in the frequency with the vibrations at the vibration source; a third electric control signal producing means for producing a electric control signal by providing at least one off intervals of a predetermined random timing and random width on each pulse of the reference pulse signal to correlate the control amplitude with the amplitude of the vibrations at the vibration source; a second storage means for mapping and storing a plurality of the control signals which have been produced by the reference signal producing means and the third electric control signal producing means from the input pulse signals correlated in the frequency with the vibrations at the vibration source; a second electric control signal read-out means responsive to the input pulse signal for reading its corresponding electric control signal out from the second storage means so that the electric control signal read out by the second electric control signal read-out means is applied to the driving means.

A method of controlling a pneumatic vibrator which has an air-tightly enclosed air chamber and a switching means provided across an air flow passage communicated to the air chamber for switching between two pneumatic pressure sources for supply of different pressures to communicate with the air chamber, wherein the air chamber is varied in the inner pressure by operating the switching means to produce a vibrating force for actively suppressing vibrations at a vibration source to be controlled, is provided comprising the steps of: producing a reference pulse signal of a duty ratio synchronized with an input pulse signal correlated in the frequency with the vibrations at the vibration source; producing a carrier signal of which the frequency is higher than the frequency of the reference pulse signal while correlating and substituting the control amplitude with the duty ratio to correspond to the amplitude of the vibrations at the vibration source; and producing the control signal by superimposing the carrier signal on the reference pulse signal while allowing each pulse of the control signal, produced by superimposing pulses of the carrier signal on pulses of the reference signal, to have the first spike increased greater in width than the other spikes so that the switching action of the switching means can be controlled by the control signal.

According to the method of controlling a pneumatic vibrator of this invention, as the control signal contains the reference pulse signal synchronized with the input pulse signal correlated in frequency with the vibrations at the vibration source and having a duty ratio tailored to minimize the generation of a high frequency component, it can successfully inhibit the generation of the high frequency component. Also, as the control signal contains the carrier signal of which the frequency is higher than that of the reference pulse signal and which is superimposed on the reference pulse signal while its control amplitude is correlated with and substituted by the duty ratio to correspond to the amplitude of the vibrations at the vibration source, it can favorably determine the vibrating force in response to a change in the inner pressure of the air chamber. Moreover, the first spike of each pulse of the control signal produced by superimposing pulses of the reference pulse signal on pulses of the carrier signal is greater in width than the other spikes in the same pulse. As the width of the first spike is greater than the width of each of the other spikes in the pulse, delay of the response of a driving current fed to the switching means to the reception of the control signal, which inhibits the vibrating force from corresponding to the duty ratio of the carrier signal when the duty ratio is lowered, can be avoided. More specifically, the switching means can be actuated with the driving current which corresponds to the duty ratio of the carrier signal or is correlated with the amplitude of the vibrations at the vibration source. Since the inner pressure in the air chamber is shifted to a desired level, it can develop the vibrating force optimum for actively suppressing the vibrations at the vibration source.

The method of controlling a pneumatic vibrator may be modified in which the first spike of each pulse of the control signal produced by superimposing pulses of the carrier signal on pulses of the reference pulse signal is increased greater in width than the other spikes and correlated in width with the duty ratio of the carrier signal.

As the first spike of each pulse of the control signal produced by superimposing pulses of the carrier signal on pulses of the reference pulse signal is increased greater in width than the other spikes of the same pulse, delay of the response of a driving current fed to the switching means to the reception of the control signal received in case of the duty ratio of the carrier signal lowered can be avoided, hence allowing the vibrating force to be generated corresponding to the carrier signal. Also, as the width of the first spike is not equal but increased corresponding to the duty ratio of the carrier signal, the driving current can favorably correspond to the duty ratio of the carrier signal. This allows the inner pressure in the air chamber to be varied corresponding to the amplitude of the vibrations at the vibration source. Accordingly, the vibrating force determined by the change in the inner pressure can be used to suppress the vibrations at the vibration source at higher effectiveness.

Alternatively, a method of controlling a pneumatic vibrator according to the present invention is provided comprising the steps of: producing a reference pulse signal of a duty ratio synchronized with an input pulse signal correlated in the frequency with the vibrations at the vibration source; and producing the control signal by providing at least one off intervals of a predetermined random timing and random width in each pulse of the reference pulse signal to correlate the control amplitude with the amplitude of the vibrations at the vibration source so that the switching action of the switching means can be controlled by the control signal.

This controlling method allows the control signal to contain the reference pulse signal synchronized with the input pulse signal correlated in frequency with the vibrations at the vibration source and having a duty ratio tailored to minimize the generation of a high frequency component so that it can successfully inhibit the generation of the high frequency component. Also, the control signal produced by providing at least one off intervals of a predetermined random timing and random width in each pulse of the reference pulse signal is used to control the switching action of the switching means, thus determining an optimum level of the vibrating force for the change in the inner pressure of the air chamber. Accordingly, the driving current determined by the control signal can successfully develop the change in the inner pressure in the air chamber and thus a desired level of the vibrating force to actively suppress the vibrations at the vibration source.

The method of controlling a pneumatic vibrator may be modified in which as a plurality of the control signals have been produced in advance from the input pulse signals and stored in a map, one control signal corresponding to the current input pulse signal is selected from the stored control signals and used for controlling the switching action of the switching means.

This allows the generation of the high frequency component to be eliminated at the vibrating force determined by a change in the inner pressure of the air chamber and also, the driving current to be developed corresponding to the control signal. Accordingly, the inner pressure in the air chamber can be varied correlating with the amplitude of the vibrations at the vibration source. Moreover, the control signals are produced from the input pulse signals based on the vibration source and stored in a map. This can simplify the arrangement of the control section, thus significantly decreasing the cost of the controlling components.

A pneumatic vibrator according to the present invention is provided comprising: a reference pulse signal producing means for producing a reference pulse signal of a duty ratio synchronized with an input pulse signal correlated in the frequency with the vibrations at the vibration source; a carrier signal producing means for producing a carrier signal of which the frequency is higher than the frequency of the reference pulse signal while correlating and substituting the control amplitude with the duty ratio to correspond to the amplitude of the vibrations at the vibration source; a control signal producing means for producing the control signal by superimposing the carrier signal on the reference pulse signal while allowing each pulse of the control signal, produced by superimposing pulses of the carrier signal on pulses of the reference signal, to have the first spike increased greater in width than the other spikes; and a switching control means responsive to the control signal produced by the control signal producing means for controlling the switching action of the switching means.

According to the pneumatic vibrator of the present invention, as the control signal contains the reference pulse signal produced by the reference pulse signal producing means, which is synchronized with the input pulse signal correlated in frequency with the vibrations at the vibration source and has a duty ratio tailored to minimize the generation of a high frequency component, it can successfully inhibit the generation of the high frequency component. Also, as the control signal which contains the carrier signal of which the control amplitude is correlated with and substituted by the duty ratio to correspond to the amplitude of the vibrations at the vibration source is superimposed on the reference pulse signal is produced by the control signal producing means, it can favorably determine the vibrating force in response to a change in the inner pressure of the air chamber. Moreover, the first spike of each pulse of the control signal produced by the control signal producing means superimposing pulses of the reference pulse signal on pulses of the carrier signal is greater in width than the other spikes in the same pulse. As the width of the first spike is greater than the width of each of the other spikes in the pulse, delay of the response of a driving current fed to the switching means to the reception of the control signal, which inhibits the vibrating force from corresponding to the duty ratio of the carrier signal when the duty ratio is lowered, can be avoided. More specifically, the switching means can be actuated with the driving current which corresponds to the duty ratio of the carrier signal or is correlated with the amplitude of the vibrations at the vibration source. Since the inner pressure in the air chamber is shifted to a desired level, it can develop the vibrating force optimum for actively suppressing the vibrations at the vibration source.

The pneumatic vibrator may be modified in which the control signal producing means is replaced by a second control signal producing means for producing the control signal in which the first spike of each pulse of the control signal produced by superimposing pulses of the carrier signal on pulses of the reference pulse signal is increased greater in width than the other spikes and correlated in width with the duty ratio of the carrier signal.

As the first spike of each pulse of the control signal produced by the second control signal producing means superimposing pulses of the carrier signal on pulses of the reference pulse signal is increased greater in width than the other spikes of the same pulse, delay of the response of a driving current fed to the switching means to the reception of the control signal received in case of the duty ratio of the carrier signal lowered can be avoided, hence allowing the vibrating force to be generated corresponding to the carrier signal. Also, as the second control signal producing means modifies the width of the first spike to be not equal but increased corresponding to the duty ratio of the carrier signal, the driving current can favorably correspond to the duty ratio of the carrier signal. This allows the inner pressure in the air chamber to be varied corresponding to the amplitude of the vibrations at the vibration source. Accordingly, the vibrating force determined by the change in the inner pressure can be used to suppress the vibrations at the vibration source at higher effectiveness.

Alternatively, another pneumatic vibrator according to the present invention is provided comprising: a storage means for mapping and storing a plurality of the control signals produced in advance from the input pulse signals correlated in the frequency with the vibrations at the vibration source using the reference pulse signal producing means and the carrier signal producing means defined in claim 9 and the control signal producing means defined in claim 9 or the second control signal producing means defined in claim 10 a control signal read-out means responsive to the input pulse signal for reading its corresponding control signal out from the storage means; and a switching control means responsive to the control signal read out by the control signal read-out means for controlling the switching action of the switching means.

In this pneumatic apparatus, the control signals produced from the input pulse signals by the reference pulse signal producing means, the carrier signal producing means, and the control signal producing means or the second control signal producing means are mapped and saved in the storage means and when desired, one control signal corresponding to the input pulse signal is read out by the control signal read-out means and used for driving the switching means with the help of the controlling action of the switching control means. This allows the high frequency component to be successfully eliminated and the driving current to be generated corresponding to the control signal, hence developing a change in the inner pressure in the air chamber which properly corresponds to the control amplitude of the input pulse signal related to the amplitude of the vibrations at the vibration source. Also, since the control signals are mapped and stored in the storage means and when desired, one of them corresponding to the pulse signal from the vibration source is read out by the control signal read-out means, the control section can be simplified in the arrangement and thus reduced in the cost. Accordingly, the vibrating force of an optimum level can be generated to actively suppress the vibrations at the vibration source. In case of mass production, the vibrator can be fabricated at less cost particularly in the control section.

A further pneumatic vibrator according to the present invention is provided comprising: a reference pulse signal producing means for producing a reference pulse signal having a given duty ratio and synchronized with an input pulse signal correlated in the frequency with the vibrations at the vibration source; a third control signal producing means for producing a control signal by providing at least one off intervals of a predetermined random timing and random width on each pulse of the reference pulse signal to correlate the control amplitude with the amplitude of the vibrations at the vibration source; a second storage means for mapping and storing a plurality of the control signals which have been produced by the reference signal producing means and the third control signal producing means from the input pulse signals correlated in the frequency with the vibrations at the vibration source;a second control signal read-out means responsive to the input pulse signal for reading its corresponding control signal out from the second storage means; and a second switching control means responsive to the control signal read out from the second control signal read-out means for controlling the switching action of the switching means.

In this pneumatic vibrator, a plurality of the control signals produced in advance from the input pulse signals by the reference pulse signal producing means and the third control signal producing means are mapped and saved in the second storage means and when desired, one control signal corresponding to the input pulse signal is read out by the second control signal read-out means and used for driving the switching means with the help of the controlling action of the switching control means. More particularly, the reference pulse signal which is synchronized with the input pulse signal correlated in frequency with the vibrations at the vibration source and has a duty ratio tailored to minimize the high frequency component can be generated by the reference signal producing means and eliminate the generation of the high frequency component derived from a change in the inner pressure in the air chamber. As the control signal is produced by the third control signal producing means providing at least one off intervals of a predetermined random timing and random width in each pulse of the reference pulse signal and used for controlling the switching action of the switching means, the vibration force can be determined to match the change in the inner pressure of the air chamber. Accordingly, the high frequency component can successfully be eliminated and the driving current can be obtained corresponding to the control signal. Hence, the inner pressure in the air chamber can favorably be varied to develop a desired level of the control amplitude corresponding to the amplitude of the vibrations at the vibration source.

Also, since the control signals are mapped and stored in the second storage means and when desired, one of them corresponding to the pulse signal from the vibration source is read out by the second control signal producing means, the control section can be simplified in the arrangement and thus reduced in the cost. Accordingly, the vibrating force of an optimum level can be generated to actively suppress the vibrations at the vibration source. In case of mass production, the vibrator can be fabricated at less cost particularly in the control section.

A method of controlling an electromagnetic vibrator, according to the present invention, which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal to generate a vibrating force for actively suppressing vibrations at a vibration source, is provided comprising the steps of: producing a reference pulse signal of a duty ratio synchronized with an input pulse signal correlated in the frequency with the vibrations at the vibration source; producing a carrier signal of which the frequency is higher than the frequency of the reference pulse signal while correlating and substituting the control amplitude with the duty ratio to correspond to the amplitude of the vibrations at the vibration source; and producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

According to the method of controlling an electromagnetic vibrator, as the electric control signal contains the reference pulse signal synchronized with the input pulse signal correlated in frequency with the vibrations at the vibration source and having a duty ratio tailored to minimize the generation of a high frequency component, it can successfully inhibit the generation of the high frequency component in the driving means and develop a desired level of the vibrating force which contains a corresponding frequency component. Also, as the electric control signal contains the carrier signal of which the frequency is higher than that of the reference pulse signal and which is superimposed on the reference pulse signal while its control amplitude is correlated with and substituted by the duty ratio to correspond to the amplitude of the vibrations at the vibration source, it can favorably determine the vibrating force in response to vibrations of the vibrating member. Moreover, the first spike of each pulse of the electric control signal produced by superimposing pulses of the reference pulse signal on pulses of the carrier signal is greater in width than the other spikes in the same pulse. As the width of the first spike is greater than the width of each of the other spikes in the pulse, delay of the response of a driving current fed to the switching means to the reception of the electric control signal, which inhibits the vibrating force from corresponding to the duty ratio of the carrier signal when the duty ratio is lowered, can be avoided. More specifically, the vibrating member can be vibrated with the driving current which corresponds to the duty ratio of the carrier signal or is correlated with the amplitude of the vibrations at the vibration source. Since the vibrating member is vibrated to a desired level, it can develop the vibrating force optimum for actively suppressing the vibrations at the vibration source.

The method of controlling an electromagnetic vibrator may be modified in which the first spike of each pulse of the electric control signal produced by superimposing pulses of the carrier signal on pulses of the reference pulse signal is increased greater in width than the other spikes and correlated in width with the duty ratio of the carrier signal.

As the first spike of each pulse of the electric control signal produced by superimposing pulses of the carrier signal on pulses of the reference pulse signal is increased greater in width than the other spikes of the same pulse, delay of the response of a driving current fed to the switching means to the reception of the electric control signal received in case of the duty ratio of the carrier signal lowered can be avoided, hence allowing the vibrating force of the vibrating member to be generated corresponding to the carrier signal. Also, as the width of the first spike is not equal but increased corresponding to the duty ratio of the carrier signal, the driving current can favorably correspond to the duty ratio of the carrier signal. This allows the vibrating force to be adjusted to a desired level corresponding to the amplitude of the vibrations at the vibration source. Accordingly, the vibrating force of the desired level can be used to suppress the vibrations at the vibration source at higher effectiveness.

Alternatively, a method of controlling an electromagnetic vibrator according to the present invention is provided comprising the steps of: producing a reference pulse signal of a duty ratio synchronized with an input pulse signal correlated in the frequency with the vibrations at the vibration source; and producing the electric control signal by providing at least one off intervals of a predetermined random timing and random width in each pulse of the reference pulse signal to correlate the control amplitude with the amplitude of the vibrations at the vibration source.

This controlling method allows the electric control signal to contain the reference pulse signal synchronized with the input pulse signal correlated in frequency with the vibrations at the vibration source and having a duty ratio tailored to minimize the generation of a high frequency component so that it can successfully inhibit the generation of the high frequency component in the driving means and also develop a desired level of the vibrating force which contains a corresponding frequency component. Also, the electric control signal produced by providing at least one of f intervals of a predetermined random timing and random width in each pulse of the reference pulse signal is used to control the switching action of the switching means, thus determining an optimum level of the vibrating force for the vibrations at the vibration source. Accordingly, the driving current determined by the electric control signal can successfully develop the vibrating force corresponding to the amplitude of the vibrations at the vibration source and attenuate the generation of the high frequency component at more effectiveness in addition to the effect of reducing the high frequency component derived from the reference pulse signal. As the vibrating force is determined to more precisely a desired level, it can actively suppress the vibrations at the vibration source.

The method of controlling an electromagnetic vibrator may be modified in which as a plurality of the electric control signals have been produced in advance from the input pulse signals and stored in a map, one electric control signal corresponding to the current input pulse signal is selected from the stored control signals and applied to the driving means.

This allows the generation of the high frequency component to be eliminated in the driving means and the vibration force to be adjusted to a desired for corresponding vibrations. Also, the driving current can be obtained corresponding to the electric control signal and thus the vibrating force can be applied corresponding to the amplitude of the vibrations at the vibration source. Moreover, the electric control signals are produced from the input pulse signals correlated in frequency with the vibrations at the vibration source and stored in a map. This can simplify the arrangement of the control section, thus contributing to the cost down of the control section of the electromagnetic vibrator.

An electromagnetic vibrator according to the present invention is provided comprising: a reference pulse signal producing means for producing a reference pulse signal of a duty ratio synchronized with an input pulse signal and correlated in the frequency with the vibrations at the vibration source; a carrier signal producing means for producing a carrier signal of which the frequency is higher than the frequency of the reference pulse signal while correlating and substituting the control amplitude with the duty ratio to correspond to the amplitude of the vibrations at the vibration source; and an electric control signal producing means for producing the electric control signal by superimposing the carrier signal on the reference pulse signal while allowing each pulse of the control signal, produced by superimposing pulses of the carrier signal on pulses of the reference pulse signal, to have the first spike increased greater in width than the other spikes.

According to the electromagnetic vibrator of the present invention, as the electric control signal contains the reference pulse signal produced by the reference pulse signal producing means, which is synchronized with the input pulse signal correlated in frequency with the vibrations at the vibration source and has a duty ratio tailored to minimize the generation of a high frequency component, it can successfully inhibit the generation of the high frequency component and develop a desired level of the vibrating force which contains a corresponding frequency component. Also, as the electric control signal which contains the carrier signal of which the control amplitude is correlated with and substituted by the duty ratio to correspond to the amplitude of the vibrations at the vibration source is superimposed on the reference pulse signal is produced by the electric control signal producing means, it can favorably determine the vibrating force. Moreover, the first spike of each pulse of the electric control signal produced by the electric control signal producing means superimposing pulses of the reference pulse signal on pulses of the carrier signal is greater in width than the other spikes in the same pulse. As the width of the first spike is greater than the width of each of the other spikes in the pulse, delay of the response of a driving current fed to the driving means to the reception of the electric control signal, which inhibits the vibrating force from corresponding to the duty ratio of the carrier signal when the duty ratio is lowered, can be avoided. More specifically, the vibrating member can be vibrated for developing a desired level of the vibrating force by the driving means fed with the driving current which corresponds to the duty ratio of the carrier signal or is correlated with the amplitude of the vibrations at the vibration source. This allows the electromagnetic vibrator to use a desired level of the vibrating force for actively suppressing the vibrations at the vibration source.

The electromagnetic vibrator may be modified in which the electric control signal producing means is replaced by a second electric control signal producing means for producing the electric control signal in which the first spike of each pulse of the electric control signal produced by superimposing pulses of the carrier signal on pulses of the reference pulse signal is increased greater in width than the other spikes and correlated in width with the duty ratio of the carrier signal.

As the first spike of each pulse of the electric control signal produced by the second electric control signal producing means superimposing pulses of the carrier signal on pulses of the reference pulse signal is increased greater in width than the other spikes of the same pulse, delay of the response of a driving current fed to the driving means to the reception of the electric control signal received in case of the duty ratio of the carrier signal lowered can be avoided, hence allowing the vibrating force for vibrating the vibrating member to be generated corresponding to the carrier signal. Also, as the second electric control signal producing means modifies the width of the first spike to be not equal but increased corresponding to the duty ratio of the carrier signal, the driving current can favorably correspond to the duty ratio of the carrier signal, hence developing the vibrating force corresponding to the amplitude of the vibrations at the vibration source. Accordingly, the vibrating force of a desired level can be used to suppress actively the vibrations at the vibration source at higher effectiveness.

Alternatively, an electromagnetic vibrator according to the present invention is provided comprising: a storage means for mapping and storing a plurality of the electric control signals produced in advance from the input pulse signals correlated in the frequency with the vibrations at the vibration source using the reference pulse signal producing means and the carrier signal producing means defined in claim 17 and the electric control signal producing means defined in claim 17 or the second electric control signal producing means defined in claim 18 an electric control signal read-out means responsive to the input pulse signal for reading its corresponding electric control signal out from the storage means so that the electric control signal read out by the electric control signal read-out means can be applied to the driving means.

In this electromagnetic apparatus, the electric control signals produced in advance from the input pulse signals, each being correlated in frequency with the vibrations at the vibration source, by the reference pulse signal producing means, the carrier signal producing means, and the electric control signal producing means or the second electric control signal producing means are mapped and saved in the storage means and when desired, one electric control signal corresponding to the input pulse signal is read out by the electric control signal read-out means and used for driving the driving means. This allows, as defined in claims 17 and 18, the high frequency component in the driving means to be successfully eliminated thus to develop a desired level of the vibrating force which contains a corresponding frequency component and the driving current for the driving means to be generated corresponding to the electric control signal, hence using the vibrating force which properly corresponds to the amplitude of the vibrations at the vibration source. Also, since the electric control signals are mapped and stored in the storage means and when desired, one of them corresponding to the input pulse signal from the vibration source is read out by the electric control signal producing means, the control section can be simplified in the arrangement and thus reduced in the cost. Accordingly, the vibrating force of an optimum level can be generated to actively suppress the vibrations at the vibration source. In case of mass production, the electromagnetic vibrator can be fabricated at less cost particularly in the control section.

A further electromagnetic vibrator according to the present invention is provided comprising: a reference pulse signal producing means for producing a reference pulse signal having a given duty ratio and synchronized with an input pulse signal correlated in the frequency with the vibrations at the vibration source; a third electric control signal producing means for producing a electric control signal by providing at least one off intervals of a predetermined random timing and random width on each pulse of the reference pulse signal to correlate the control amplitude with the amplitude of the vibrations at the vibration source; a second storage means for mapping and storing a plurality of the control signals which have been produced by the reference signal producing means and the third electric control signal producing means from the input pulse signals correlated in the frequency with the vibrations at the vibration source; and a second electric control signal read-out means responsive to the input pulse signal for reading its corresponding electric control signal out from the second storage means so that the electric control signal read out by the second electric control signal read-out means can be applied to the driving means.

In this electromagnetic vibrator, the electric control signals produced from the input pulse signals, each being correlated in frequency with the vibrations at the vibration source, by the reference pulse signal producing means and the third control signal producing means are mapped and saved in the second storage means and when desired, one electric control signal corresponding to the input pulse signal is read out by the second electric control signal read-out means and used for driving the driving means.

More particularly, the reference pulse signal of the electric control signal which is synchronized with the input pulse signal correlated in frequency with the vibrations at the vibration source and has a duty ratio tailored to minimize the high frequency component can be generated by the electric control signal producing means and used for eliminating the generation of the high frequency component in the driving means. As the electric control signal is produced by the third electric control signal producing means providing at least one off intervals of a predetermined random timing and random width in each pulse of the reference pulse signal to correlate the control amplitude with the amplitude of the vibrations at the vibration source and used for controlling the action of the driving means, the driving current can be obtained corresponding to the electric control signal and thus the vibrating force can be determined to match the amplitude of the vibrations at the vibration source. Accordingly, the generation of the high frequency component will be eliminated at more effectiveness in addition to the effect of the reference pulse signal for eliminating the high frequency component. Also, since the electric control signals are mapped and stored in the second storage means and when desired, one of them corresponding to the input signal can be read out by the second electric control signal read-out means, the control section can be simplified in the arrangement and thus reduced in the cost. Accordingly, the vibrating force of an optimum level in the electromagnetic vibrator can be generated to actively suppress the vibrations at the vibration source. In case of mass production, the electromagnetic vibrator can be fabricated at less cost particularly in the control section.

BRIEF DESCRIPTION OF THE DRAWINGS

FIGS. 4A,B is an explanatory diagram illustrating the relationship between a control signal C and a driving current;

FIG. 5 is a graphic diagram showing the result of experiment with a vibrating force based from a change in the inner pressure of an air chamber of the pneumatic vibrator for the frequency of vibrations;

FIG. 21 is an explanatory diagram illustrating the composition of signals in a conventional electromagnetic vibrator.

DETAILED DESCRIPTION OF THE PREFERRED EMBODIMENTS

Figure 1:
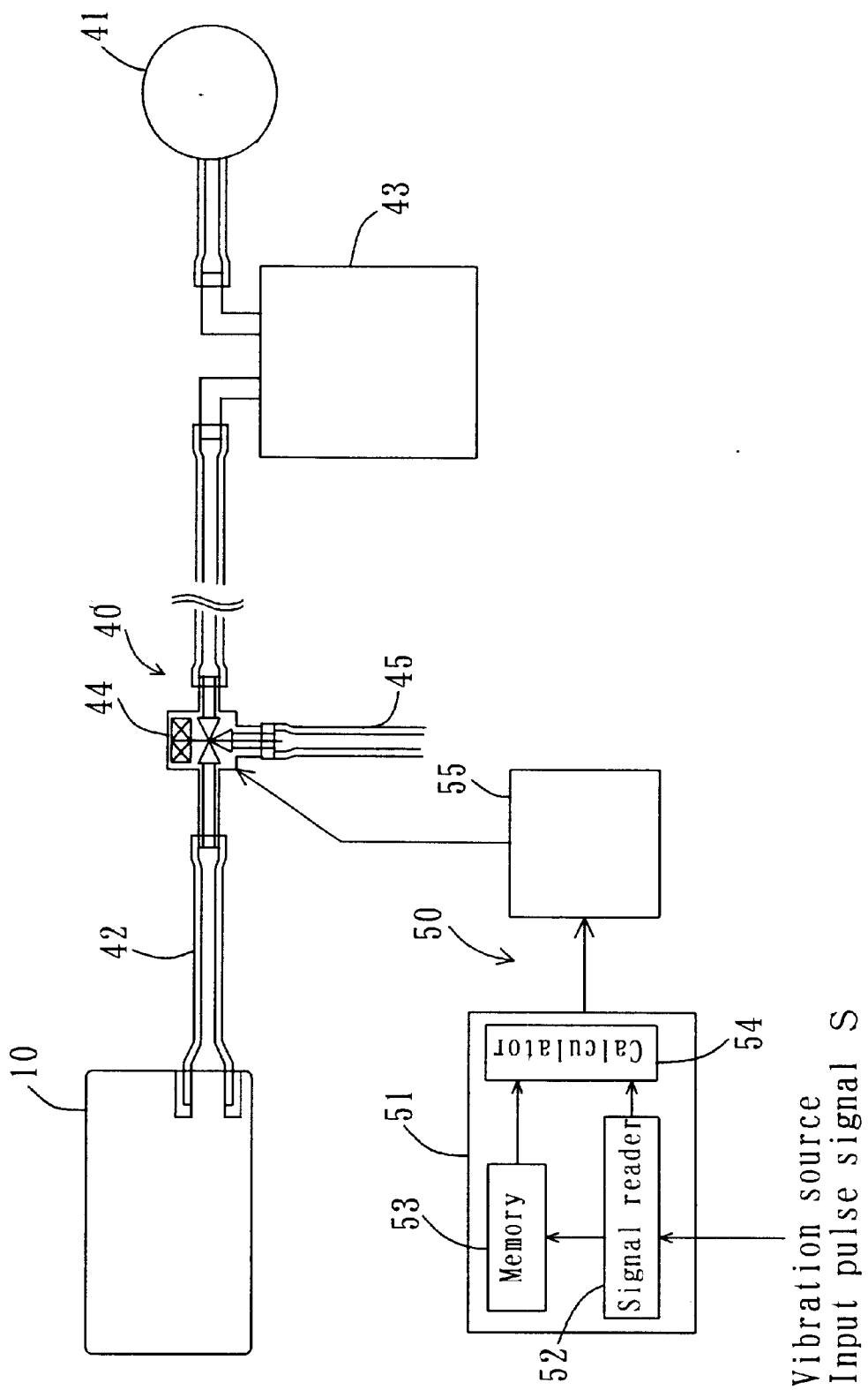
FIG. 1 is a schematic view of an overall arrangement of a pneumatic vibrator for use in a vehicle according to one embodiment of the present invention.
Figure 2:
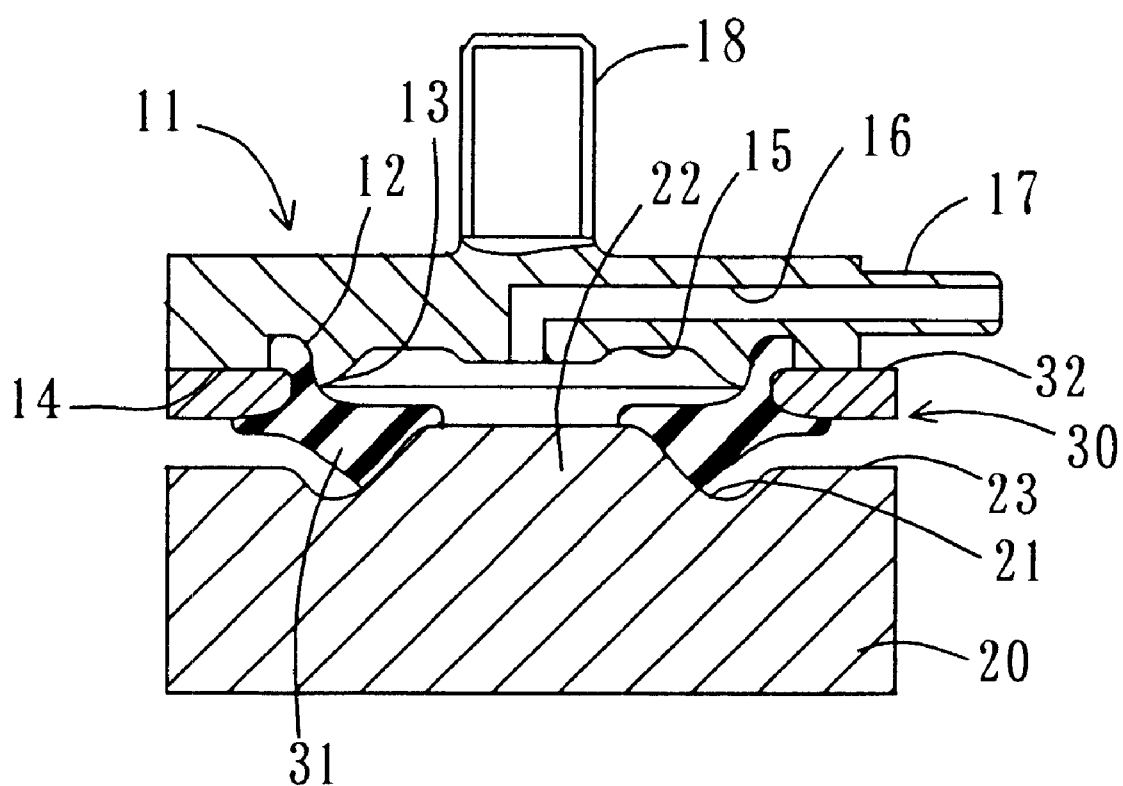
FIG. 2 is a cross sectional view schematically showing a damper in the pneumatic vibrator.

One embodiment of the present invention will now be described referring to the relevant drawings. FIG. 1 is a schematic view of an overall arrangement of a pneumatic vibrator of the embodiment applied for controlling vibrations of an object such as the body of a vehicle and FIG. 2 is a cross sectional view of a damper as a primary component of the pneumatic vibrator. The pneumatic vibrator comprises the damper 10 and a pneumatic controlling means 50 for driving the damper 10 to change the pneumatic pressure to develop a vibrating force.

The damper 10 comprises a metal mount 11 mounted to vibrating region of the chassis of a vehicle, a mass member 20 disposed opposite to the metal mount 11, and a rubber elastic body 30 elastically joining between the metal mount 11 and the mass member 20, which all define an air chamber 35 therebetween. The pneumatic controlling means 40 includes different two pneumatic pressure source; an air intake port 41 of the engine serving as a negative pressure source and an atmospheric or ambient pressure port. In action, as the air chamber 35 of the damper 10 is alternately de-pressurized and pressurized by the ambient pressure at intervals of a predetermined period, it generates a change in the inner pressure to develop a vibrating force on the mass member 20. The vibrations of the mass member 20 is then transmitted to the chassis for actively suppressing the vibrations of the chassis. For actively suppressing the vibrations of the chassis at high effectiveness, the change in the pressure in the air chamber 35 can be controlled in the amplitude and the phase by the action of the controlling means to match the amplitude of the vibrations (in upward and downward directions in the figure) to be suppressed. The two pneumatic pressure sources are not limited to the negative pressure source and the ambient pressure port but may be a combination of two different pressure sources by using positive pressure sources.

The metal mount 11 is arranged of a disk shape, as shown in FIG. 2, having an annular groove 12 provided coaxially in one side (the lower side in figure) thereof close to the outer peripheral edge. Also, an annular projection 13 is provided on the inner side adjacent to the groove 12 in the radial direction on the same side of the metal mount 11.

The metal mount 11 also has a shallow recess 15 provided in the same side thereof on the inner side of the projection 13, which is set off from the flat surface 14 on the outer side of the groove 12. A vent hole 16 is provided in the metal member 11 which extends inwardly from the outer periphery to the center and then downwardly to the same side to open at the recess 15. The vent hole 16 is communicated at the outer periphery with a port 17 for connection with an air flow passage 42 described later. A bolt 18 is mounted upright on the other side (the upper side) of the metal mount 11. The metal mount 11 is fixedly joined to the chassis by threading the bolt 18 into.

The mass member 20 is arranged of a disk shape substantially equal in the outer diameter to the metal mount 11 having a recess 21 provided in the side thereof, facing the metal mount 11, to become opposite to the projection 13. It also has a center projection 22 of a trapezoid shape in cross section provided on thereof on the inner side of the recess 21 and a flat surface 23 thereof on the outer side of the same.

The rubber elastic body 30 is an annular disk which is substantially equal in the outer diameter to the groove 12 and comprises a rubber material 31 shaped with its outer and inner peripheral sides displaced axially from each other and an annular metal support 32 fixedly bonded by vulcanized adhesion to the outer side of the rubber material 31. The outer diameter of the metal support 32 is substantially equal to that of the mass member 20. The rubber elastic body 30 is anchored to the metal mount 11 by the metal support 32 joining firmly by welding or the like to the flat surface 14 of the metal mount 11. The inner peripheral side of the rubber elastic material 30 is bonded by adhesive to the sloped side of the projection 22 of the mass member 20. As a result, an air chamber 35 is airtightly provided as defined by the metal mount 11, the mass member 20, and the rubber elastic body 30.

When installed in a vehicle, as shown in FIG. 1, the damper 10 is connected to a pneumatic controlling means 40 for actively controlling the vibrating action of the damper 10. The port 17 of the damper 10 is communicated with an air flow passage 42 which is in turn communicated to an air intake port 41 of the engine acting as the negative pressure source. A negative pressure tank 43 is provide across the air flow passage 42 for stabilizing the negative pressure at the air intake port 41. A three-port electromagnetic valve 44 is mounted near the port 17 across and communicated at its two ports with the air flow passage 42. The other port of the electromagnetic valve 44 is communicated with a pipe 45 opened to the atmosphere. When not energized, the electromagnetic valve 44 allows the air chamber 35 to communicate through the atmosphere. When energized, the electromagnetic valve 44 switches to communicate the air chamber 35 with the negative pressure tank 43. The communication may be controlled by a reverse manner.

An electric controlling apparatus for controlling the energization of the electromagnetic valve 44 is now explained. The electric controlling apparatus 50 includes a controller 51 incorporating with a microcomputer as shown in FIG. 1. The controller 51 comprises a signal reader 52 for reading the frequency and the running condition (with the amplitude and the phase) from an input pulse signal S indicative of the frequency of vibrations at the vibration source, i.e. a pulse signal output of a revolution sensor mounted to the engine, a memory 53 for storage of the control signal C based on the input pulse signal S, and a calculator 54 responsive to a signal output of the signal reader 52 for selectively retrieving the control signal C from the memory 53 and delivering it to a driver 55 for opening and closing actions of the solenoid of the electromagnetic valve 44. The calculator 54 in the controller 51 is connected at its output to the driver 55 for driving the solenoid of the electromagnetic valve 44.

Figure 3:
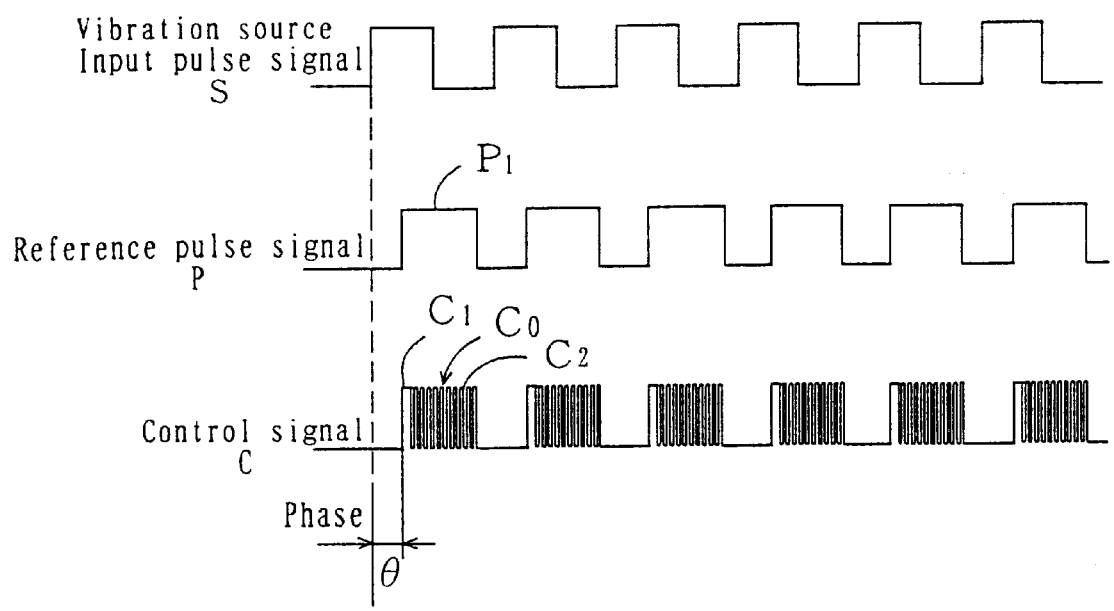
FIG. 3 is an explanatory diagram illustrating the composition of signals in the pneumatic vibrator.

The preparation of the control signal C is explained referring to FIG. 3. First, a reference pulse signal P is produced which is synchronized in frequency with and out of phase by θ with the input pulse signal S and has a duty ratio of approximately 50% for minimizing the generation of a high frequency component. It is assumed that the frequency to be controlled is as low as ranging from 20 Hz to 100 Hz for carrying out the idling mode. Then, a carrier signal (not shown) is produced of which the frequency is higher in that of input pulse signal S, for example, 200 Hz to 1 kHz, and which has a duty ratio correlated with the amplitude of the vibrations at the vibration source. The carrier signal may be produced directly from a shift position signal or a vehicle speed signal correlated with the amplitude of the vibrations at the vibration source or through a series of experiments using data of those signals.

The control signal C is produced by superimposing the carrier signal on the reference pulse signal P. Particularly as shown in FIGS. 3 and 4, the first spike C1 of each pulse C0 of the control signal C produced by superimposing the carrier signal on each pulse P1 of the reference pulse signal P is increased greater in width than the other spikes C2 in the same pulse. FIG. 4 illustrates the control pulse C0 at the upper and its driving current at the lower which is varied corresponding to a change of the duty ratio of the pulse shape of the carrier signal.

If all the spikes of each pulse of the carrier signal in the control signal C are uniform in the width, a delay of the current in response to the control signal C may fail to develop the driving current with the duty ratio of the carrier signal lowered excessively. For building the driving current at timing with the pulse, the first spike C1 is increased in the width greater than the following spikes C2. The controls signal C are predetermined from different input pulse signals S, mapped, and stored in the memory 53. The control signal C may be produced in the calculator 54 from the input pulse signal S and transferred directly to the driver 55 although the arrangement of the controller becomes more intricate.

The action of the first embodiment having the prescribed arrangement is explained.

Upon an ignition switch switched on, the controller 51 starts its action of receiving and reading the input pulse signal S in the signal reader 52. The calculator 54 calculates the frequency of the input pulse signal S and the control signal C corresponding to the amplitude and the phase at the frequency is retrieved from the memory 53 and delivered to the external driver 55. In response to the control signal C, the driver 55 generates the driving current to switch the electromagnetic valve 44 on and off for communicating the air chamber 35 with the air intake port 41 and the atmosphere alternately. This causes the inner pressure in the air chamber 35 to change and develop the vibrating force to vibrate the mass member 20 for offsetting the vibrations of the chassis of the vehicle, hence actively suppressing the vibrations of the chassis.

As the duty ratio of each pulse C0 of the control signal C supplied from the calculator 54 is so determined as to minimize the generation of a high frequency component, the vibrating force can be avoided from having high frequency components. Also, the first spike C1 of the pulse having the duty ratio corresponding to the amplitude change is greater in the width than the other spikes C2 in the same pulse, thus favorably inhibiting delay of the driving current for driving the electromagnetic valve 44 from the reception of the control signal C. As a result, the electromagnetic valve 44 can be actuated by the driving current which corresponds to the duty ratio of the carrier signal or the amplitude of the vibrations at the vibration signal source. This allows the air chamber 35 to generate a desired level of the pressure for determining the vibrating force of the damper 10, hence successfully suppressing the vibrations of the chassis. Moreover, since the control signals C are predetermined from the input pulse signals S of different frequencies, mapped, and stored in the memory 53 and when desired, selectively retrieved from the memory 53, the controller can be simplified in the arrangement and decreased in the cost.

The result of experiment of the first embodiment is now explained.

The pneumatic vibrator of the present invention was compared with a conventional pneumatic vibrator excluding a branch hose over a given range of frequencies by measuring a desired frequency or primary component and an undesired high frequency or secondary component of the vibrating force developed in the air chamber 35. The measurements are shown in FIG. 5. As apparent from FIG. 5, the present invention is not significantly different from the prior art over the first component but the prior art exhibits a greater level of the secondary component. In other words, the pneumatic vibrator of the present invention can significantly attenuate the secondary component.

A modification of the first embodiment is explained.

Figure 6A:
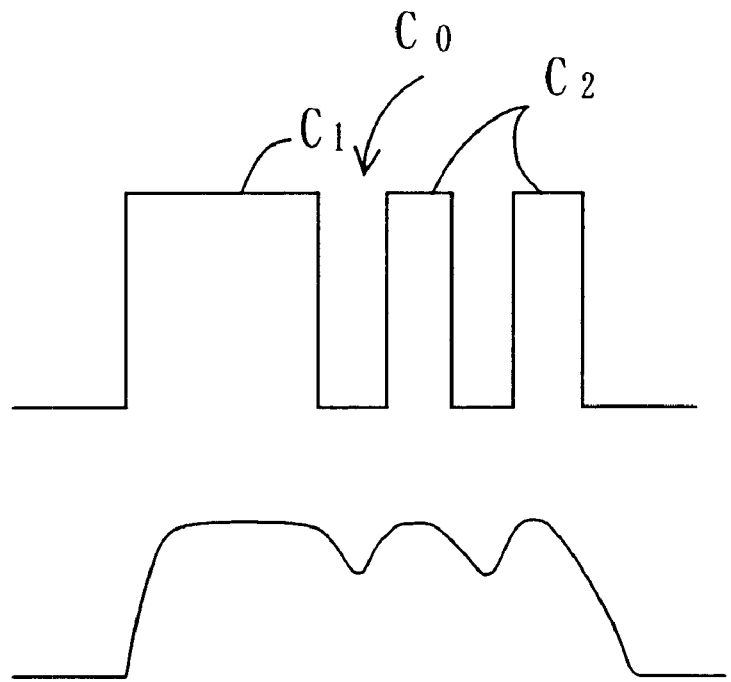
FIGS. 6A,B is an explanatory diagram illustrating the relationship between a control signal C and a driving current in the modification.
Figure 6B:
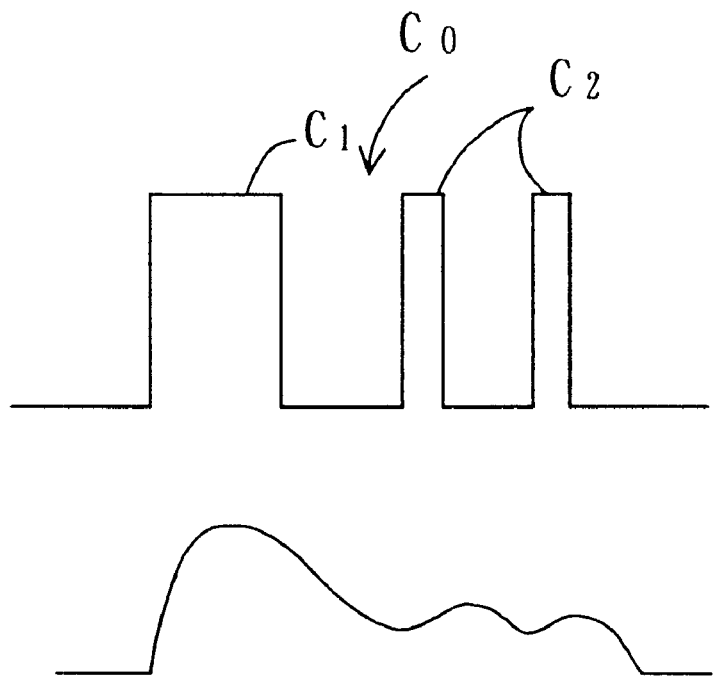

In the modification, the carrier signal of which the frequency is higher, for example 200 Hz to 1 kHz, than that of the input pulse signal S and has a duty ratio corresponding to the amplitude of the vibrations is superimposed on the reference pulse signal P. Particularly as shown in FIG. 6, the first spike C1 of each pulse C0 of the control signal produced from the carrier pulse is greater in the width than the following spikes C2 in the same pulse and the width of the first spike C1 is variably determined by the duty ratio of the carrier signal.

The modification like the first embodiment permits the duty ratio of each pulse C0 of the control signal C supplied from the calculator 54 to be preset for minimizing the generation of undesired high frequency component, hence diminishing the high frequency component. Also, as the width of the first spike C1 of each pulse C0 produced from the carrier signal having a duty ratio determined by the amplitude of the vibrations is greater than that of the following spikes C2, a delay of the driving current for driving the electromagnetic valve 44 from the reception of the control signal C can be avoided. Accordingly, the electromagnetic valve 44 can be actuated by the driving current corresponding to the duty ratio of the carrier signal or the amplitude of the input pulse signal S derived from the vibration source. In the modification, as the width of the first spike C1 of each pulse C0 of the control signal C is determined by the duty ratio of the carrier signal, delay of the response of the driving current can be avoided as well as the driving current when the duty ratio is too small can be prevented from exceeding its rated value in response to the extended width of the first spike C1 of the pulse. This allows the air chamber 35 to develop a desired level of the pressure to determine the vibrating force. Therefore, the vibrating force of the damper 10 will be optimized thus properly suppressing the vibrations of the chassis.

(2) Second Embodiment

A second embodiment of the present invention will be described.

Figure 7:
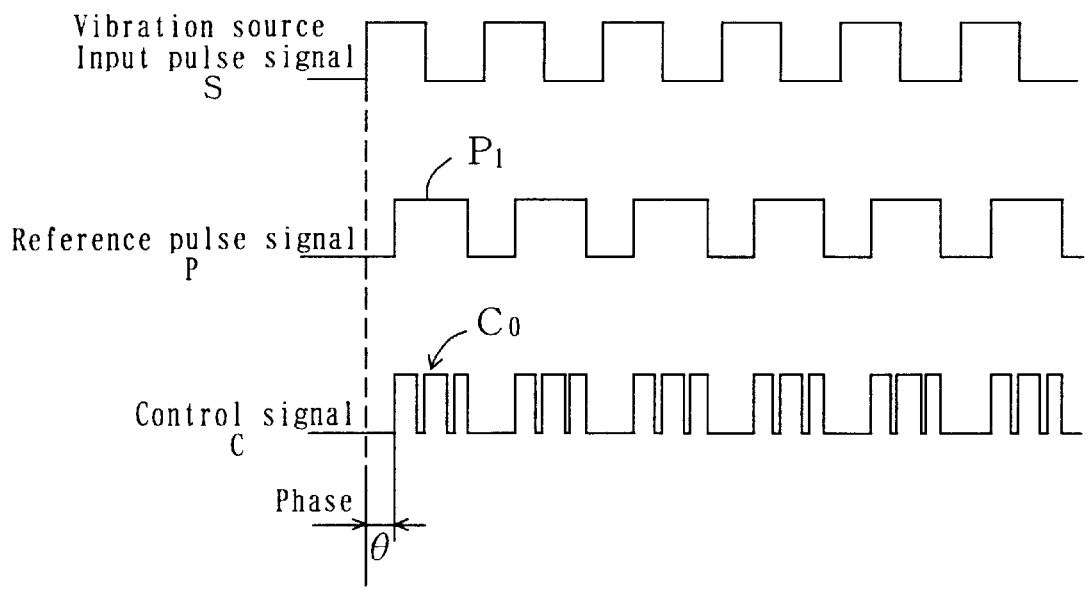
FIG. 7 is an explanatory diagram illustrating the composition of signals in the modified pneumatic vibrator as the second embodiment.
Figure 8:
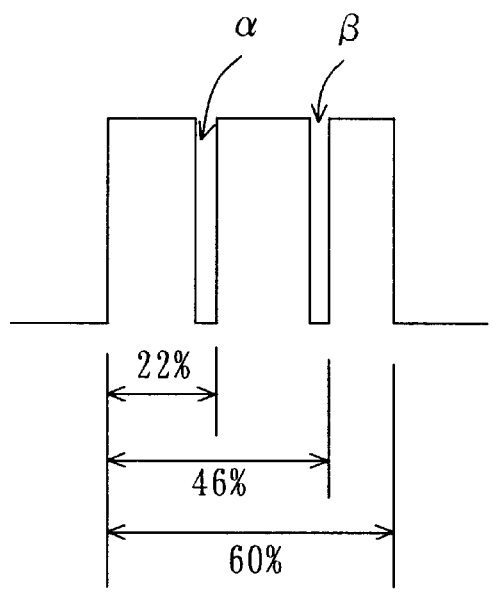
FIG. 8 is an explanatory diagram illustrating a detail of the control signal.

The control signal C of the second embodiment is produced, as shown in FIG. 7, by shifting the phase of the reference pulse signal P from the input pulse signal S at the frequency synchronized with the signal S and providing at least one or more off intervals α, β . . . at a random timing predetermined for the reference pulse signal P to have the amplitude correlated with the amplitude of the vibrations at the vibration source and used for controlling the switching action of the electromagnetic valve 44. For example, as shown in FIG. 8, the controls signal C is produced by providing the off intervals α and β of 5% wide at timing of 22% and 46% on each pulse of the reference pulse signal P of which the duty ratio is 60%. The off intervals are calculated from a series of experiments to match the control amplitude with the amplitude of the vibrations at the vibration source. Similarly, the control signals C are predetermined from different input pulse signals S, mapped, and stored in the memory 53.

The second embodiment, like the first embodiment, allows the control signal C from the calculator 54 to be adjusted with the duty ratio of its pulse C0 for minimizing the generation of undesired high frequency component, hence diminishing the high frequency component. Also, the switching action of the electromagnetic valve 44 is controlled with the control signal C produced by providing the off intervals α, β of a random width at random timing predetermined on each pulse P1 of the reference pulse signal P in order to determine a desired level of the vibrating force of the damper 10 from a change in the pressure of the air chamber 35. This allows the driving current generated from the control signal C to develop the vibrating force of the damper 10 which corresponds to the amplitude of the vibrations at the vibration source. As a result, this embodiment like the first embodiment allows the damper 10 to develop a desired level of the vibrating force, hence properly suppressing the vibrations of the chassis.

The result of experiment of the second embodiment is now explained in more detail.

Figure 9:
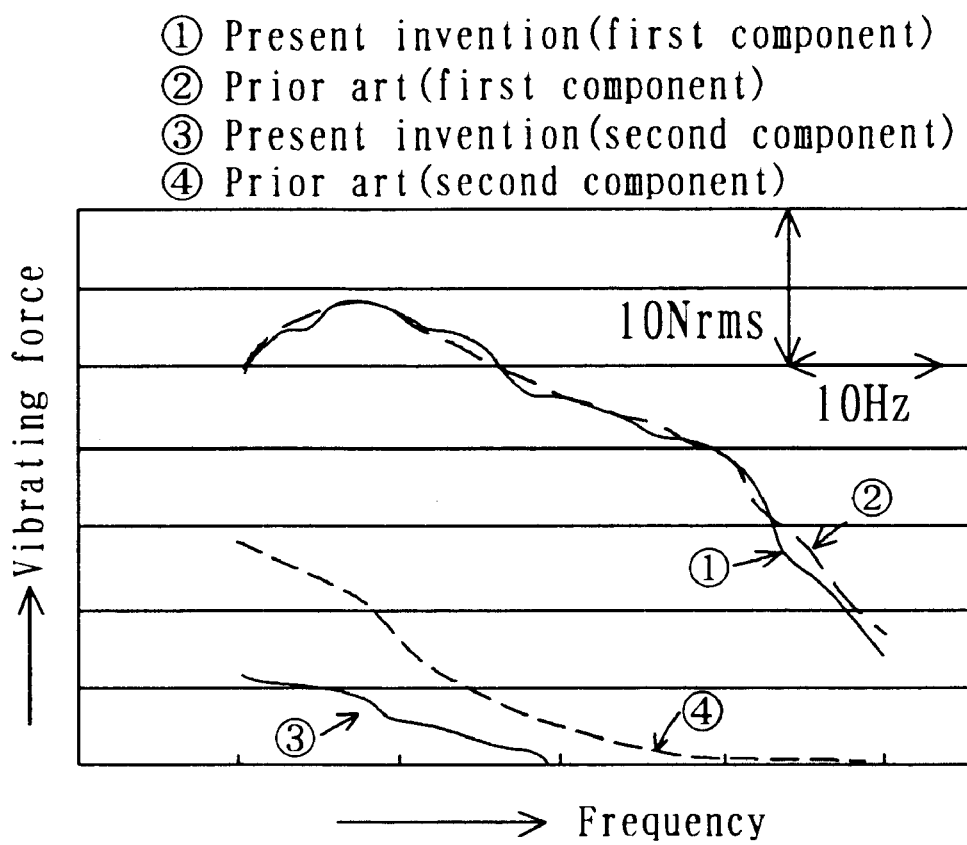
FIG. 9 is a graphic diagram showing the result of experiment with a vibrating force based from a change in the inner pressure of an air chamber of the pneumatic vibrator of the second embodiment for the frequency of vibrations.

The pneumatic vibrator of the second embodiment was compared with a conventional pneumatic vibrator excluding a branch hose over a given range of frequencies by measuring a desired frequency or primary component and an undesired high frequency or secondary component of the vibrating force developed in the air chamber 35. The measurements are shown in FIG. 9. As apparent from FIG. 9, the second embodiment like the first embodiment is not significantly different from the prior art over the first component but the prior art exhibits a greater level of the secondary component as a whole. In other words, the pneumatic vibrator of the second embodiment can significantly attenuate the secondary component.

(3) Third Embodiment

Figure 10:
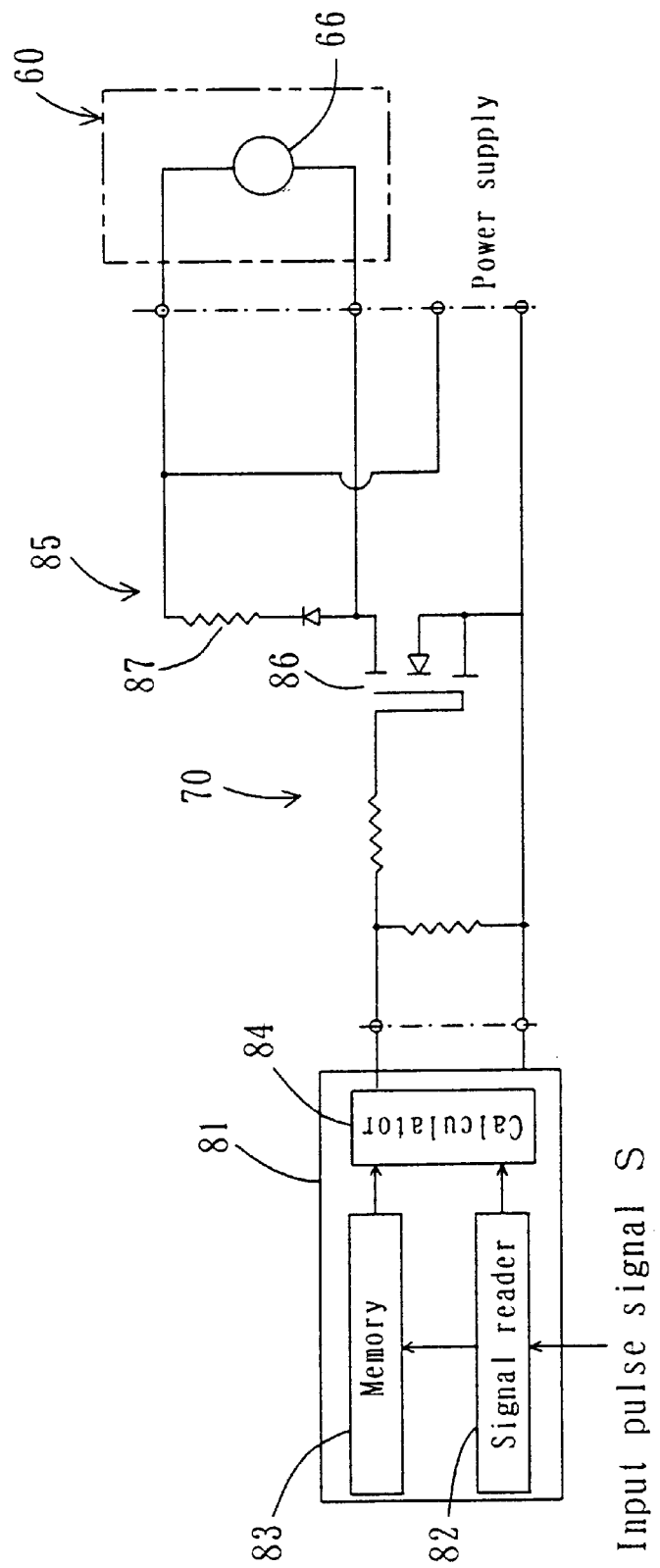
FIG. 10 is a schematic block diagram of an overall arrangement of an electromagnetic vibrator for use in a vehicle according to third embodiment of the present invention.
Figure 11:
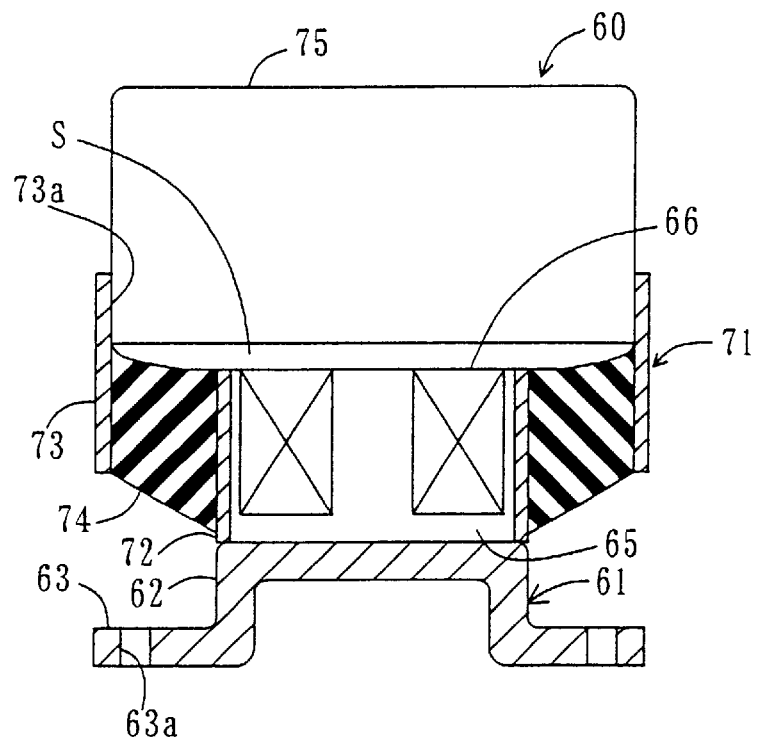
FIG. 11 is a cross sectional view schematically showing a damper in the electromagnetic vibrator.

A further embodiment of the present invention will be described referring to the relevant drawings. FIG. 10 is a schematic view of an overall arrangement of an electromagnetic vibrator for controlling the vibrations of an object such as the chassis of a vehicle illustrating the third embodiment of the present invention. FIG. 11 is a partially cross sectional view of a damper as a primary component of the electromagnetic vibrator. The electromagnetic vibrator comprises the damper 60 and a driver controlling means 80 for controlling the action of the damper 60 to develop the vibrating force.

The damper 60, as shown in FIG. 11, comprises a metal mount 61, an electromagnet 66 supported by a yoke 65 mounted to the metal mount 61, a mass member 75 disposed coaxially (at the upper in the illustration) opposite to and spaced by a predetermined distance from the yoke 65, and a rubber elastic member 71 of substantially a cylindrical form joining between the yoke 65 and the mass member 75. The metal mount 61 comprises a bottomed cylindrical portion 62 and a flange portion 63 of an annular form extending from the opening of the cylindrical portion 62 (at the lower in the illustration)in an outward direction at a right angle to the axis. The flange portion 63 has a group of tightening holes 63a provided therein along the circumference. The yoke 65 of a column form is coaxially disposed on the flat bottom of the cylindrical portion 62. The electromagnet 66 is arranged of an annular shape embedded coaxially in the yoke 65 and its top is exposed from the top of the yoke 65.

The rubber elastic member 71 has a small diameter, inner ring 72 and a large diameter, outer ring 73 provided coaxially and displaced axially from each other. More specifically, the outer ring 73 is axially displaced at one end slightly from the inner ring 72. The axial length of the inner ring 72 is substantially equal to that of the yoke 65 but slightly shorter than that of the outer ring 73. The rubber material 74 shaped by vulcanize forming is sandwiched between the outer side of the inner ring 72 and the inner side, from the other axial end to an intermediate region, of the outer ring 73, thus elastically joining the two rings 72 and 73 to each other. Both ends of the rubber material 74 are moderately sloped down from the outer ring 73 to the inner ring 72.

The rubber elastic member 71 is anchored to the yoke 65 by press fitting the inner ring 72 into the yoke 65. The column shaped mass member 75 is press fitted into the inner side 73a of the outer ring 73 of the rubber elastic member 71 where the rubber material 74 is not attached. Accordingly, a planer space S is provided between the top (at the upper) of the yoke and the bottom (at the lower) of the mass member 75.

The damper 60 is then mounted to the chassis of the vehicle by bolts or the like extending through the tightening holes 63a of the metal mount 61 and tightened to the chassis as the vibration source. The electromagnet 66 is electrically connected by leads to the driver 85 of the drive controlling means 80.

The action of the drive controlling means for controlling the energization of the electromagnet 66 in the damper 60 is now explained. The drive controlling means 80 comprises, as shown in FIG. 10, a controller 81 incorporating with a microcomputer or the like and the driver 85. The controller 81 comprises a signal reader 82 for receiving the input pulse signal S of which the frequency is correlated with the frequency of the vibrations at the vibration source such as a pulse signal output of a revolution sensor mounted to the engine and reading the frequency and its relevant running condition (with the amplitude and the phase) from the signal S, a memory 83 for storage of many control signals C produced in advance from different input pulse signals, and a calculator 84 responsive to a signal output of the signal reader 82 for selectively retrieving one of the control signals C from the memory 83 and delivering it to the driver 85. The calculator 84 of the controller 81 is electrically connected at its output to the driver 85 for switching on and off the electromagnet 66. The driver 85 includes a switching FET 86, which is responsive to the control signal C for switching on and off, connected at the output to an output resistor 87. Two leads from the electromagnet 66 of the damper are connected to both ends of the output resistor 87. A source voltage is applied to both sides of the FET 86 and the output resistor 87.

Figure 12:
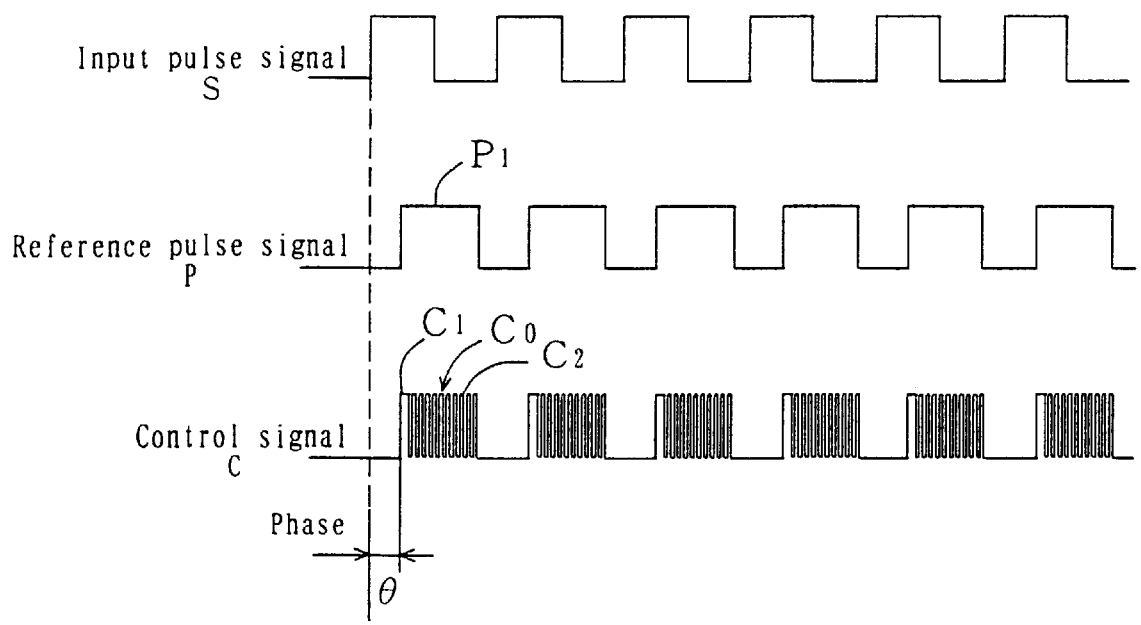
FIG. 12 is an explanatory diagram illustrating the composition of signals in the electromagnetic vibrator.

The preparation of the control signal C is now explained referring to FIG. 12. First, a reference pulse signal P is produced which is synchronized in frequency with and out of phase by θ with the input pulse signal S and has a duty ratio of approximately 50% for minimizing the generation of a high frequency component. It is assumed that the frequency to be controlled is as low as ranging from 20 Hz to 100 Hz for carrying out the idling mode. Then, a carrier signal (not shown) is produced of which the frequency is higher in that of input pulse signal S, for example, 200 Hz to 1 kHz, and which has a duty ratio correlated with the amplitude of the vibrations at the vibration source. The carrier signal may be produced directly from a shift position signal or a vehicle speed signal correlated with the amplitude of the vibrations at the vibration source or through a series of experiments using data of those signals.

Figure 13A:
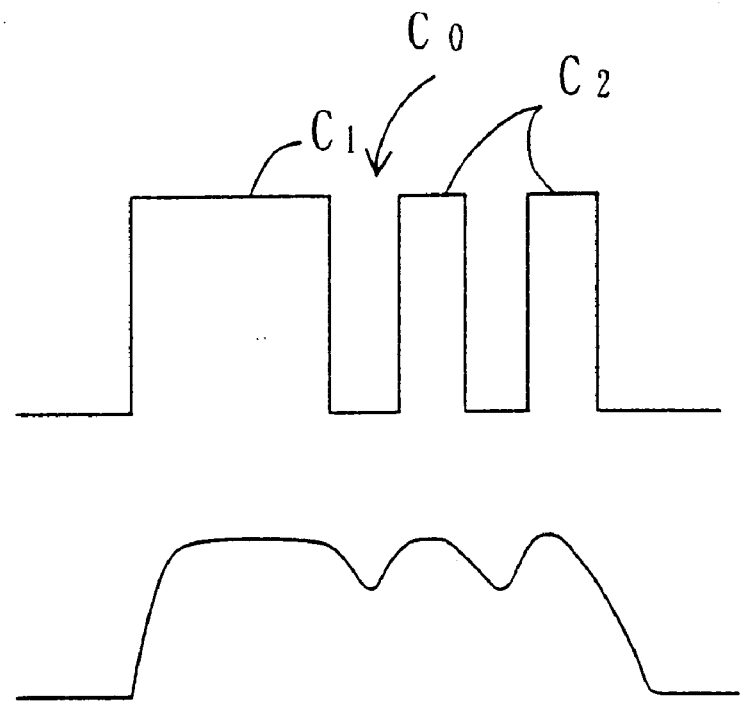
FIGS. 13A,B is an explanatory diagram illustrating the relationship between a control signal C and a driving current.
Figure 13B:
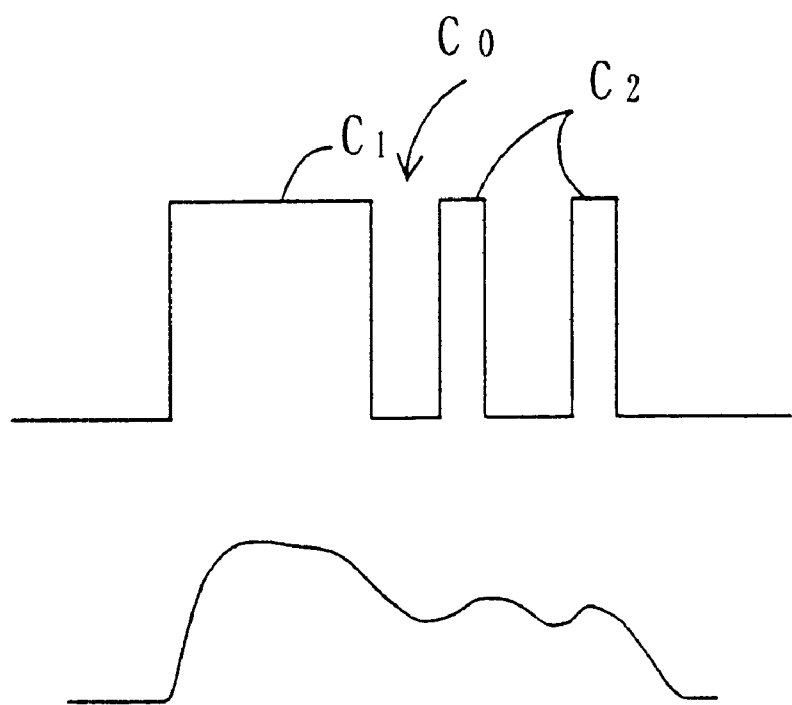

The control signal C is produced by superimposing the carrier signal on the reference pulse signal P. Particularly as shown in FIGS. 12 and 13, the first spike $C_1$ of each pulse $C_0$ of the control signal C produced by superimposing the carrier signal on each pulse $P_1$ of the reference pulse signal P is increased greater in width than the other spikes $C_2$ in the same pulse. FIG. 13 illustrates the control pulse $C_0$ at the upper and its driving current at the lower which is varied corresponding to a change of the duty ratio (50% in FIG. 13A and 33% in FIG. 13B) of the pulse shape of the carrier signal.

If all the spikes of each pulse of the carrier signal in the control signal C are uniform in the width, a delay of the current in response to the control signal C may fail to develop the driving current with the duty ratio of the carrier signal lowered excessively. For building the driving current at timing with the pulse, the first spike $C_1$ is increased in the width greater than the following spikes $C_2$. The controls signal C are predetermined from different input pulse signals S, mapped, and stored in the memory 83. The control signals C can selectively be retrieved from the memory 83 by the calculator 84 responding to the input pulse signal S received by the signal reader 82. The control signal C may be produced in the calculator 84 from the input pulse signal S and transferred directly to the driver 85 although the arrangement of the controller becomes more intricate.

The action of the third embodiment having the prescribed arrangement is explained.

Upon an ignition switch switched on, the controller 81 starts its action of receiving and reading the input pulse signal S in the signal reader 82. The calculator 84 calculates the frequency of the input pulse signal S and the control signal C corresponding to the amplitude and the phase at the frequency is retrieved from the memory 83 and delivered to the external driver 85. In response to the control signal C, the driver 85 generates the driving current to energize the electromagnet 66. As the electromagnet 66 is alternately energized and de-energized in a repeating manner, it magnetic attracting action towards the mass member 75 carries on and thus vibrates the mass 75 axially (in upward and downward directions in the illustration). The vibrations of the mass member 75 develops a vibrating force to deform the rubber elastic member 71. The deformation leads to the effect of suppressing the vibrations to actively offset the vibration at a low frequency transmitted from the chassis to the metal mount 61.

As the duty ratio of each control pulse $C_0$ of the control signal C supplied from the calculator 84 is so determined as to minimize the generation of a high frequency component, the driving current can be avoided from having high frequency components, hence vibrating the mass member 75 at a desired frequency. Also, the first spike $C_1$ of the control pulse $C_0$ from the carrier pulse having the duty ratio corresponding to the amplitude change is greater in the width than the other spikes $C_2$ in the same pulse $C_0$, thus favorably inhibiting delay of the driving current for energizing the electromagnet 66 from the reception of the control signal C when the duty ratio is lowered. Therefore, the electromagnet 66 can be energized with the driving current which corresponds to the duty ratio of the carrier signal or the amplitude of the vibrations at the vibration signal source. As a result, this allows the mass member 75 to develop a desired level of vibrations for determining the vibrating force of the damper 60, hence successfully suppressing the vibrations of the chassis. Moreover, since the control signals C are predetermined from the input pulse signals S of different frequencies, mapped, and stored in the memory 83 and when desired, selectively retrieved from the memory 83, the controller can be simplified in the arrangement and decreased in the cost.

The result of experiment of the third embodiment is now explained.

Figure 14A:
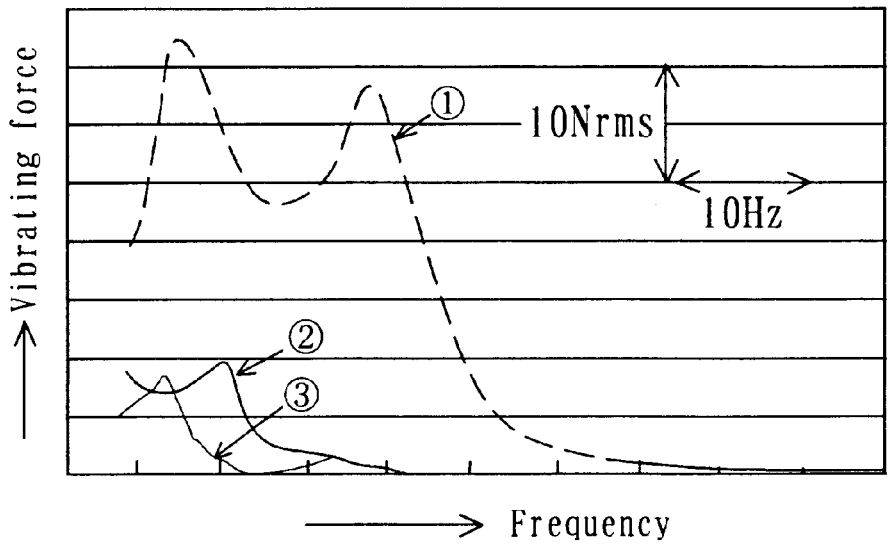
FIGS. 14A,B is a graphic diagram showing the result of experiment with a vibrating force over a given range of frequencies in the electromagnetic vibrator of the third embodiment and a conventional electromagnetic vibrator.
Figure 14B:
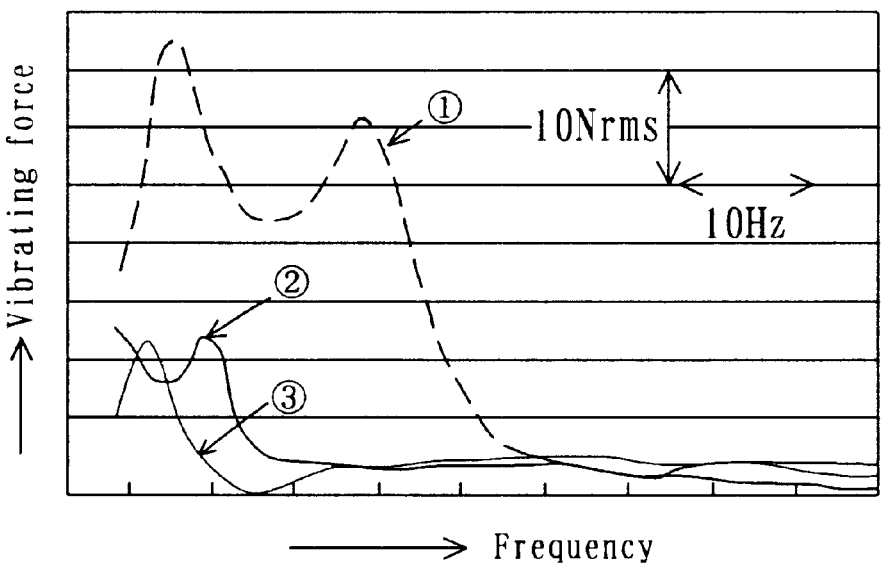

The electromagnetic vibrator of this embodiment was compared with a conventional electromagnetic vibrator of a vibration control type over a given range of frequencies by measuring a desired frequency or primary component and undesired high frequency or secondary and thirdly components of the vibrating force developed by the damper 60. The measurements are shown in FIG. 14A of the third embodiment and in FIG. 14B of the prior art. As apparent from FIG. 14, the this embodiment is not significantly different from the prior art over the first component but the prior art exhibits greater levels of the secondary and thirdly components as a whole. In other words, the electromagnetic vibrator of this embodiment can attenuate the secondary and thirdly components by substantially 3 Nrms.

A modification of the third embodiment is explained.

Figure 15A:
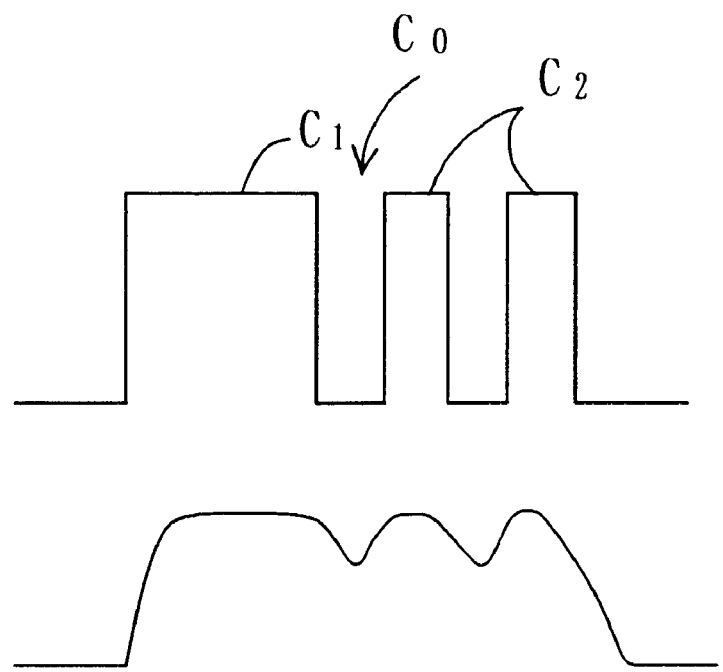
FIGS. 15A,B is an explanatory diagram illustrating the relationship between a control signal C and a driving current in a modification of the third embodiment.
Figure 15B:
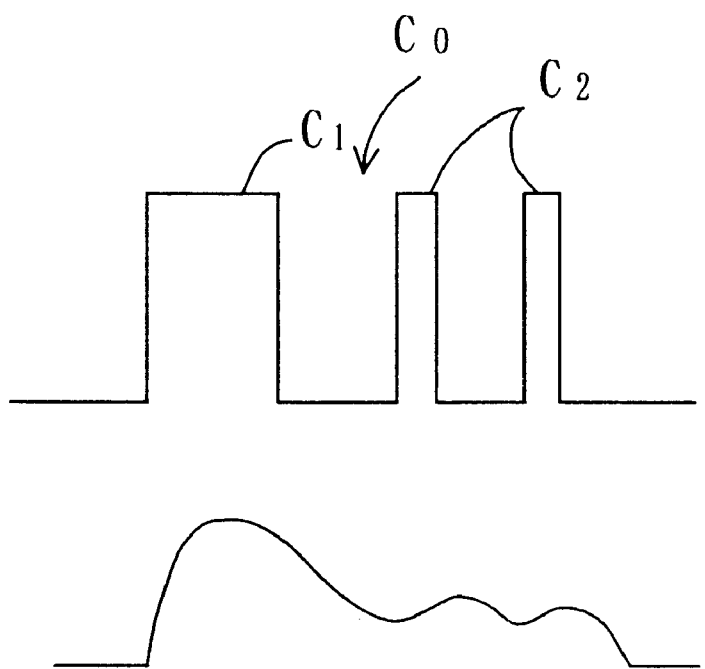

In the modification, the carrier signal of which the frequency is higher, for example 200 Hz to 1 kHz, than that of the input pulse signal S and has a duty ratio corresponding to the amplitude of the input pulse signal S is superimposed on the reference pulse signal P, thus producing the control signal C. Particularly as shown in FIG. 15, the first spike $C_1$ of each pulse $C_0$ of the control signal produced from the carrier pulse is greater in the width than the following spikes $C_2$ in the same pulse and the width of the first spike $C_1$ is variably determined by the duty ratio (50% in FIG. 15A and 33% in FIG. 15B) of the carrier signal.

The modification like the third embodiment permits the duty ratio of each pulse $C_0$ of the control signal C supplied from the calculator 84 to be preset for minimizing the generation of undesired high frequency component, hence diminishing the high frequency component and allowing the mass member 75 to vibrate at a desired frequency. Also, as the width of the first spike $C_1$ of each pulse $C_0$ produced from the carrier signal having a duty ratio determined by the amplitude of the vibrations at the vibration source is greater than that of the following spikes $C_2$, a delay of the response of the driving current for energizing the electromagnet 66 from the reception of the control signal C can be avoided. Accordingly, the electromagnet 66 can be energized with the driving current corresponding to the duty ratio of the carrier signal or the amplitude of the vibration S at the vibration signal source.

In the modification, as the width of the first spike C1 of each pulse C0 of the control signal C is determined by the duty ratio of the carrier signal, delay of the response of the driving current can be avoided as well as the driving current when the duty ratio is too small can be prevented from exceeding its rated value in response to the extended width of the first spike $C_1$ of the pulse. This allows the mass member 75 to vibrate a desired frequency to determine the vibrating force. Therefore, the vibrating force of the damper 60 in the modification will be optimized thus more properly suppressing the vibrations of the chassis.

(4) Fourth Embodiment

A fourth embodiment of the present invention will be described.

Figure 16:
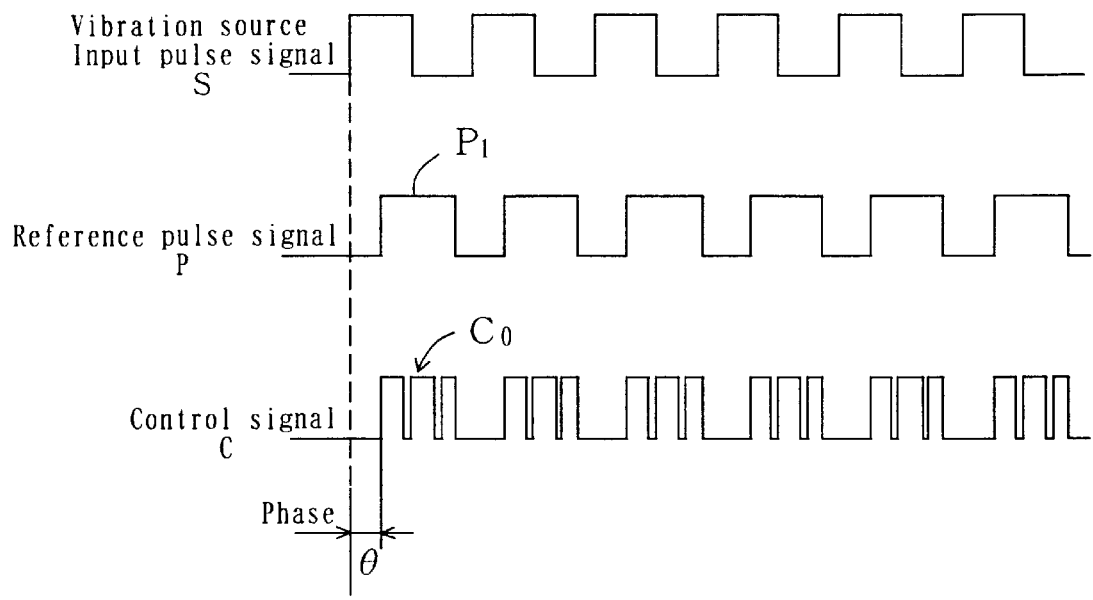
FIG. 16 is an explanatory diagram illustrating the composition of signals in the electromagnetic vibrator as the fourth embodiment.
Figure 17:
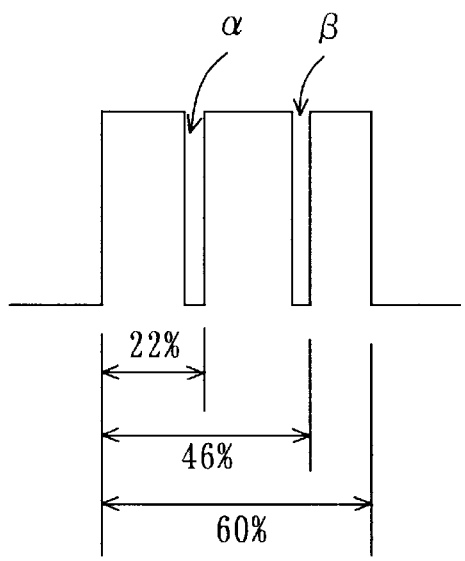
FIG. 17 is an explanatory diagram illustrating a detail of the control signal.

The reference pulse signal P is produced, as shown in FIG. 16, by shifting properly the phase from the input pulse signal S at the frequency synchronized with the signal S and providing a duty ratio tailored to minimize the high frequency component. Therefore the control signal C is then produced by providing at least one or more off intervals α, β . . . at a random timing and random width predetermined for the reference pulse signal P to have the amplitude correlated with the amplitude of the vibrations at the vibration source and used for controlling the energization of the electromagnet 66. For example, as shown in FIG. 17, the controls signal C is produced by providing the off intervals α and β of 5% wide at timing of 22% and 46% on each pulse $C_0$ of the reference pulse signal P of which the duty ratio is 60%. The off intervals are calculated from a series of experiments to match the control amplitude with the amplitude of the vibrations at the vibration source. Similarly, the control signals C predetermined by the above manner are mapped and stored in the memory 83. The control signal C may be produced from the input pulse signal although the arrangement of the controller becomes more intricate.

The fourth embodiment, like the third embodiment, allows the control signal C from the calculator 84 to be adjusted with the duty ratio of its pulse $C_0$ for minimizing the generation of undesired high frequency component, hence diminishing the high frequency component and allowing the mass member 75 to vibrate at optimum frequency. Also, the energization of the electromagnet 66 is controlled with the control signal C produced by providing the off intervals α, β . . . at a random timing and random width predetermined on each pulse P1 of the reference pulse signal P in order to determine a desired level of the vibrating force based on the vibrations of the mass member 75. This allows the driving current generated from the control signal C to develop the vibrating force of the damper 60 which corresponds to the amplitude of the vibrations at the vibration source. In this embodiment, the high frequency component can effectively be diminished in addition to minimizing the generation of the high frequency component derived from the reference pulse signal.

As a result, this embodiment like the third embodiment allows the damper 60 to develop a desired level of the vibrating force, hence properly suppressing the vibrations of the chassis.

The result of experiment of the fourth embodiment is now explained in more detail.

Figure 18:
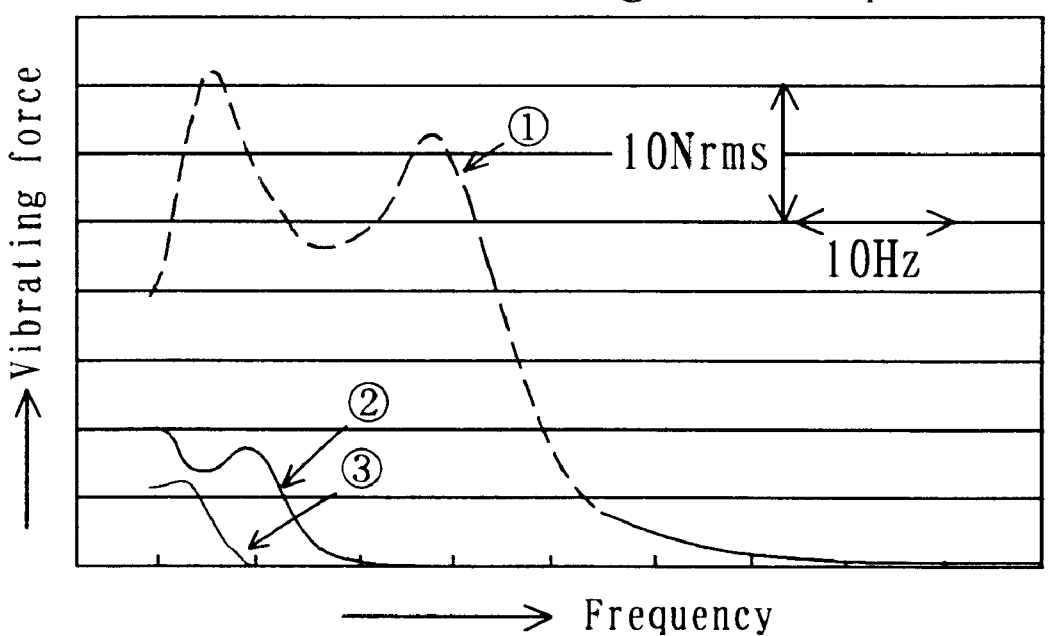
FIG. 18 is a graphic diagram showing the result of experiment with a vibrating force over the given range of frequencies in the electromagnetic vibrator of the fourth embodiment.
Figure 19:
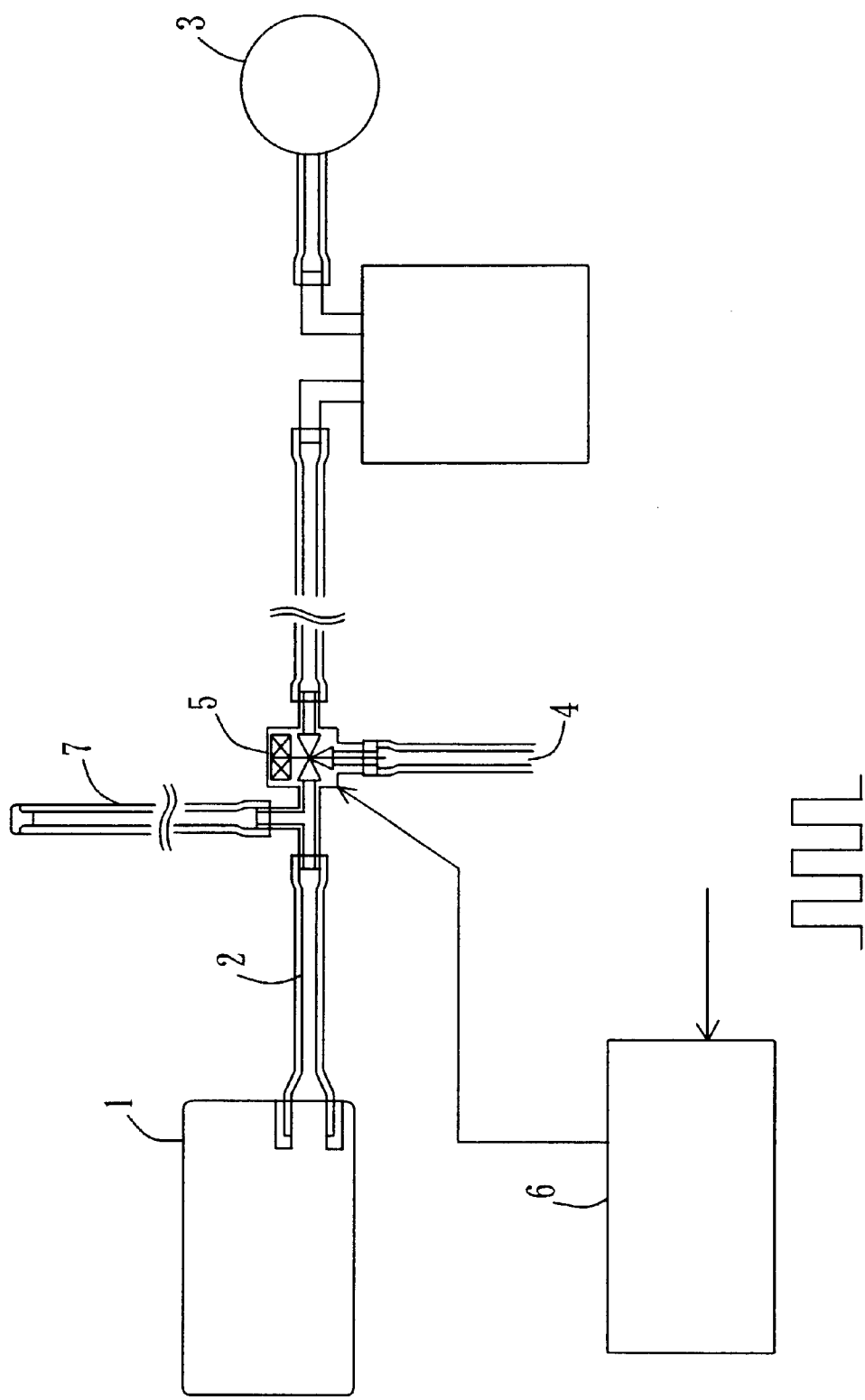
FIG. 19 is a schematic view of an overall arrangement of a conventional pneumatic vibrator for use in a vehicle.
Figure 20:
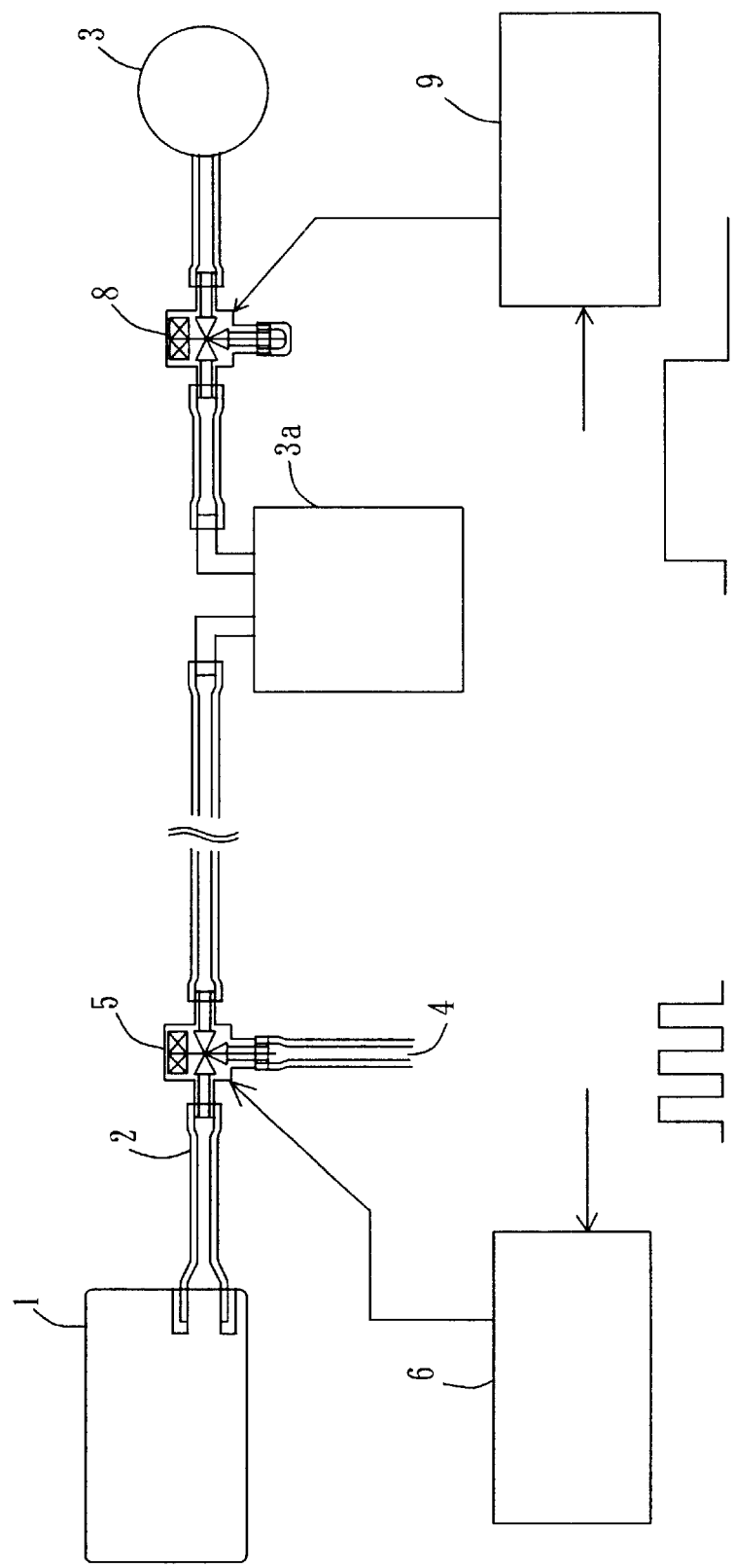
FIG. 20 is a schematic view of an overall arrangement of another conventional pneumatic vibrator for use in a vehicle.
Figure 2:
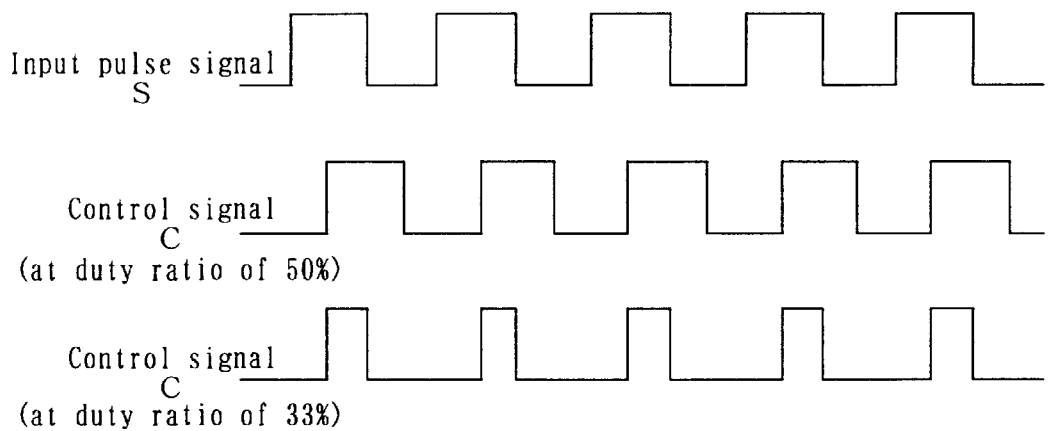
Figure 22:
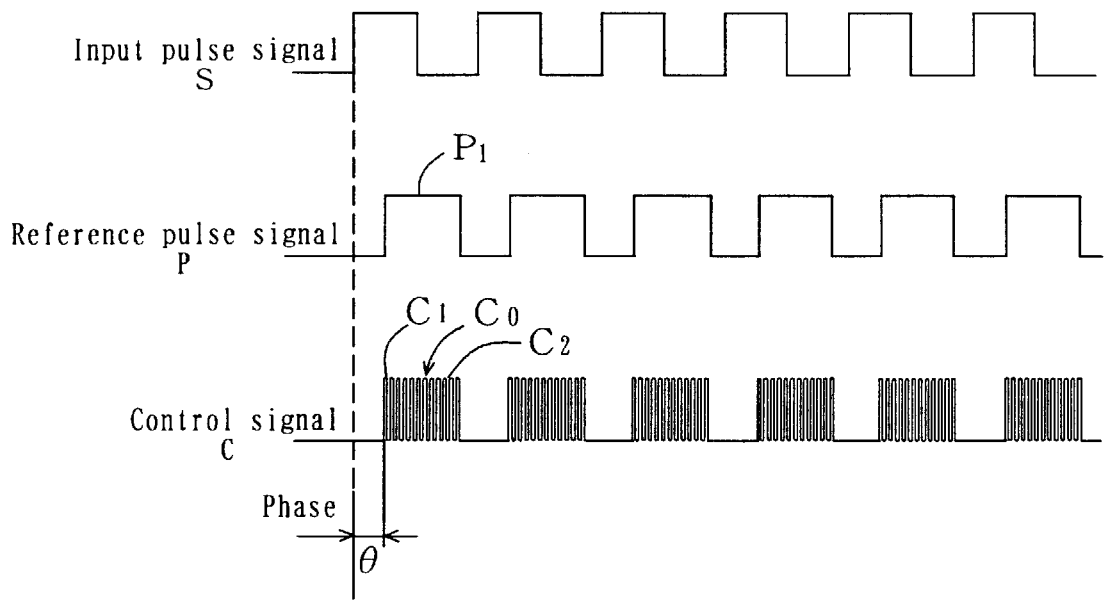
FIG. 22 is an explanatory diagram illustrating the composition of signals in another conventional electromagnetic vibrator.

The electromagnetic vibrator of this embodiment was examined over a given range of frequencies by measuring a desired frequency or primary component and undesired high frequency or secondary and thirdly components of the vibrating force developed on the mass member 75. The measurements are shown in FIG. 18. As comparing FIG. 18 with FIG. 14B, this embodiment is not significantly different from the prior art over the first component but its secondly and thirdly components are lower by 3 to 6 Nrms than those of the prior art, exhibiting better results than the third embodiment.

While the above embodiments employ the pulse signal from the revolutions of the engine as the input pulse signal correlated in the frequency with the vibrations at the vibration source, any other detection signals of air-conditioning switching on and off, shift position, water temperature, and so released from the engine control unit may be used with equal success. Although the dampers in the vibrators of the above embodiments are not of a liquid chamber type, they may be equipped with a liquid chamber. The vibrator may be a damping apparatus with or without a liquid chamber for damping excessive motions of an engine or the like. The vibrators of the present invention may also be applicable to any other object than vehicles. While the present invention is not limited to the foregoing embodiments, various changes and modifications may be made without departing from the scope of the present invention.

What is claimed is:

1. A method of controlling a vibrator which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising the steps of:

producing a reference pulse signal of a duty ratio synchronized with an input pulse signal correlated in the frequency with the vibrations at the vibration source;

producing a carrier signal of which the frequency is higher than the frequency of the reference pulse signal while correlating and substituting the control amplitude with the duty ratio to correspond to the amplitude of the vibrations at the vibration source; and producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

2. A method of controlling a vibrator which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising the steps of:

producing a reference pulse signal of a duty ratio synchronized with an input pulse signal correlated in the frequency with the vibrations at the vibration source; and producing the electric control signal by providing at least one off intervals of a predetermined random timing and random width in each pulse of the reference pulse signal to correlate the control amplitude with the amplitude of the vibrations at the vibration source.

3. A vibrator having a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising:

a reference pulse signal producing means for producing the reference pulse signal of a duty ratio synchronized with an input pulse signal correlated in the frequency with the vibrations at the vibration source;

a carrier signal producing means for producing a carrier signal of which the frequency is higher than the frequency of the reference pulse signal while correlating and substituting the control amplitude with the duty ratio to correspond to the amplitude of the vibrations at the vibration source; and an electric control signal producing means for producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

4. A vibrator having a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising:

a reference pulse signal producing means for producing a reference pulse signal having a given duty ratio and synchronized with an input pulse signal correlated in the frequency with the vibrations at the vibration source;

a third electric control signal producing means for producing a electric control signal by providing at least one off intervals of a predetermined random timing and random width on each pulse of the reference pulse signal to correlate the control amplitude with the amplitude of the vibrations at the vibration source;

a second storage means for mapping and storing a plurality of the control signals which have been produced by the reference signal producing means and the third electric control signal producing means from the input pulse signals correlated in the frequency with the vibrations at the vibration source;

a second electric control signal read-out means responsive to the input pulse signal for reading its corresponding electric control signal out from the second storage means so that the electric control signal read out by the second electric control signal read-out means is applied to the driving means.

5. A method of controlling a pneumatic vibrator which has an air-tightly enclosed air chamber and a switching means provided across an air flow passage communicated to the air chamber for switching between two pneumatic pressure sources for supply of different pressures to communicate with the air chamber, wherein the air chamber is varied in the inner pressure by operating the switching means to produce a vibrating force for actively suppressing vibrations at a vibration source to be controlled, comprising the steps of:

producing a reference pulse signal of a duty ratio synchronized with an input pulse signal correlated in the frequency with the vibrations at the vibration source;

producing a carrier signal of which the frequency is higher than the frequency of the reference pulse signal while correlating and substituting the control amplitude with the duty ratio to correspond to the amplitude of the vibrations at the vibration source; and producing the control signal by superimposing the carrier signal on the reference pulse signal while allowing each pulse of the control signal, produced by superimposing pulses of the carrier signal on pulses of the reference signal, to have the first spike increased greater in width than the other spikes so that the switching action of the switching means can be controlled by the control signal.

6. A method of controlling a pneumatic vibrator according to claim 5, wherein the first spike of each pulse of the control signal produced by superimposing pulses of the carrier signal on pulses of the reference pulse signal is increased greater in width than the other spikes and correlated in width with the duty ratio of the carrier signal.

7. A method of controlling a pneumatic vibrator which has an air-tightly enclosed air chamber and a switching means provided across an air flow passage communicated to the air chamber for switching between two different pneumatic pressure sources to communicate with the air chamber, wherein the air chamber is varied in the inner pressure by operating the switching means to produce a vibrating force for actively suppressing vibrations at a vibration source to be controlled, comprising the steps of:

producing a reference pulse signal of a duty ratio synchronized with an input pulse signal correlated in the frequency with the vibrations at the vibration source; and producing the control signal by providing at least one off interval of a predetermined random timing and random width in each pulse of the reference pulse signal to correlate the control amplitude with the amplitude of the vibrations at the vibration source so that the switching action of the switching means can be controlled by the control signal.

8. A method of controlling a pneumatic vibrator according to any of claims 5 to 7, wherein as a plurality of the control signals have been produced in advance from the input pulse signals and stored in a map, one control signal corresponding to the current input pulse signal is selected from the stored control signals and used for controlling the switching action of the switching means.

9. A pneumatic vibrator having an air-tightly enclosed air chamber and a switching means provided across an air flow passage communicated to the air chamber for switching between two different pneumatic pressure sources to communicate with the air chamber, wherein the air chamber is varied in the inner pressure by operating the switching means to produce a vibrating force for actively suppressing vibrations at a vibration source to be controlled, comprising:

a reference pulse signal producing means for producing a reference pulse signal of a duty ratio synchronized with an input pulse signal correlated in the frequency with the vibrations at the vibration source;

a carrier signal producing means for producing a carrier signal of which the frequency is higher than the frequency of the reference pulse signal while correlating and substituting the control amplitude with the duty ratio to correspond to the amplitude of the vibrations at the vibration source;

a control signal producing means for producing the control signal by superimposing the carrier signal on the reference pulse signal while allowing each pulse of the control signal, produced by superimposing pulses of the carrier signal on pulses of the reference signal, to have the first spike increased greater in width than the other spikes; and a switching control means responsive to the control signal produced by the control signal producing means for controlling the switching action of the switching means.

10. A pneumatic vibrator according to claim 9, wherein the control signal producing means is replaced by a second control signal producing means for producing the control signal in which the first spike of each pulse of the control signal produced by superimposing pulses of the carrier signal on pulses of the reference pulse signal is increased greater in width than the other spikes and correlated in width with the duty ratio of the carrier signal.

11. A pneumatic vibrator having an air-tightly enclosed air chamber and a switching means provided across an air flow passage communicated to the air chamber for switching between two pneumatic pressure sources for supply of different pressures to communicate with the air chamber, wherein the air chamber is varied in the inner pressure by operating the switching means to produce a vibrating force for actively suppressing vibrations at a vibration source to be controlled, comprising:

a storage means for mapping and storing a plurality of the control signals produced in advance from the input pulse signals correlated in the frequency with the vibrations at the vibration source using the reference pulse signal producing means and the carrier signal producing means defined in claim 9 and the control signal producing means defined in claim 9 or the second control signal producing means defined in claim 10;

a control signal read-out means responsive to the input pulse signal for reading its corresponding control signal out from the storage means; and a switching control means responsive to the control signal read out by the control signal read-out means for controlling the switching action of the switching means.

12. A pneumatic vibrator having an air-tightly enclosed air chamber and a switching means provided across an air flow passage communicated to the air chamber for switching between two pneumatic pressure sources for supply of different pressures to communicate with the air chamber, wherein the air chamber is varied in the inner pressure by operating the switching means to produce a vibrating force for actively suppressing vibrations at a vibration source to be controlled, comprising:

a reference pulse signal producing means for producing a reference pulse signal having a given duty ratio and synchronized with an input pulse signal correlated in the frequency with the vibrations at the vibration source;

a third control signal producing means for producing a control signal by providing at least one off intervals of a predetermined random timing and random width on each pulse of the reference pulse signal to correlate the control amplitude with the amplitude of the vibrations at the vibration source;

a second storage means for mapping and storing a plurality of the control signals which have been produced by the reference signal producing means and the third control signal producing means from the input pulse signals correlated in the frequency with the vibrations at the vibration source;

a second control signal read-out means responsive to the input pulse signal for reading its corresponding control signal out from the second storage means; and a second switching control means responsive to the control signal read out by the second control signal read-out means for controlling the switching action of the switching means.

13. A method of controlling an electromagnetic vibrator which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising the steps of:

producing a reference pulse signal of a duty ratio synchronized with an input pulse signal correlated in the frequency with the vibrations at the vibration source;

producing a carrier signal of which the frequency is higher than the frequency of the reference pulse signal while correlating and substituting the control amplitude with the duty ratio to correspond to the amplitude of the vibrations at the vibration source; and producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

14. A method of controlling an electromagnetic vibrator according to claim 13, wherein the first spike of each pulse of the electric control signal produced by superimposing pulses of the carrier signal on pulses of the reference pulse signal is increased greater in width than the other spikes and correlated in width with the duty ratio of the carrier signal.

15. A method of controlling an electromagnetic vibrator which has a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising the steps of:

produce a reference pulse signal of a duty ratio synchronized with an input pulse signal correlated in the frequency with the vibrations at the vibration source; and producing the electric control signal by providing at least one off intervals of a predetermined random timing and random width in each pulse of the reference pulse signal to correlate the control amplitude with the amplitude of the vibrations at the vibration source.

16. A method of controlling an electromagnetic vibrator according to any of claims 13 to 15, wherein as a plurality of the electric control signals have been produced in advance from the input pulse signals and stored in a map, one electric control signal corresponding to the current input pulse signal is selected from the stored control signals and applied to the driving means.

17. An electromagnetic vibrator having a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising:

a reference pulse signal producing means for producing the reference pulse signal of a duty ratio synchronized with an input pulse signal correlated in the frequency with the vibrations at the vibration source;

a carrier signal producing means for producing a carrier signal of which the frequency is higher than the frequency of the reference pulse signal while correlating and substituting the control amplitude with the duty ratio to correspond to the amplitude of the vibrations at the vibration source; and an electric control signal producing means for producing the electric control signal by superimposing the carrier signal on the reference pulse signal while allowing each pulse of the electric control signal, produced by superimposing pulses of the carrier signal on pulses of the reference pulse signal, to have the first spike increased greater in width than the other spikes.

18. An electromagnetic vibrator according to claim 17, wherein the electric control signal producing means is replaced by a second electric control signal producing means for producing the electric control signal in which the first spike of each pulse of the control signal produced by superimposing pulses of the carrier signal on pulses of the reference pulse signal is increased greater in width than the other spikes and correlated in width with the duty ratio of the carrier signal.

19. An electromagnetic vibrator having a driving means equipped with an electric-to-mechanical converting mechanism for generating a driving force corresponding to the amplitude of an electric control signal received and a vibrating member driven f or vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising:

a storage means for mapping and storing a plurality of the electric control signals produced in advance from the input pulse signals correlated in the frequency with the vibrations at the vibration source using the reference pulse signal producing means and the carrier signal producing means defined in claim 17 and the electric control signal producing means defined in claim 17 or the second electric control signal producing means defined in claim 18;

an electric control signal read-out means responsive to the input pulse signal for reading its corresponding electric control signal out from the storage means so that the electric control signal read out by the electric control signal read-out means is applied to the driving means.

20. An electromagnetic vibrator having a driving means equipped with an electric-to-mechanical converting mechanism for generating a driving force corresponding to the amplitude of an electric control signal received and a vibrating member driven for vibration by the driving force of the driving means, wherein the vibrating member is vibrated by the driving means fed with the electric control signal, which corresponds to the amplitude of vibrations at a vibration source, to generate a vibrating force for actively suppressing the vibrations at the vibration source, comprising:

a reference pulse signal producing means for producing a reference pulse signal having a given duty ratio and synchronized with an input pulse signal correlated in the frequency with the vibrations at the vibration source;

a third electric control signal producing means for producing a electric control signal by providing at least one off intervals of a predetermined random timing and random width on each pulse of the reference pulse signal to correlate the control amplitude with the amplitude of the vibrations at the vibration source;

a second storage means for mapping and storing a plurality of the control signals which have been produced by the reference signal producing means and the third electric control signal producing means from the input pulse signals correlated in the frequency with the vibrations at the vibration source;

a second electric control signal read-out means responsive to the input pulse signal for reading its corresponding electric control signal out from the second storage means so that the electric control signal read out by the second electric control signal read-out means is applied to the driving means.

* * * * *